(12) United States Patent
Kawai et al.

(10) Patent No.: US 12,133,018 B2
(45) Date of Patent: Oct. 29, 2024

(54) IMAGING ELEMENT, IMAGING APPARATUS, OPERATION METHOD OF IMAGING ELEMENT, AND PROGRAM

(71) Applicant: FUJIFILM CORPORATION, Tokyo (JP)

(72) Inventors: Tomoyuki Kawai, Saitama (JP); Ryo Hasegawa, Saitama (JP); Hitoshi Sakurabu, Saitama (JP); Makoto Kobayashi, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 143 days.

(21) Appl. No.: 17/577,346

(22) Filed: Jan. 17, 2022

(65) Prior Publication Data

US 2022/0141420 A1    May 5, 2022

Related U.S. Application Data

(63) Continuation of application No. PCT/JP2020/025834, filed on Jul. 1, 2020.

(30) Foreign Application Priority Data

Jul. 26, 2019    (JP) .................... 2019-138238

(51) Int. Cl.
*H04N 5/77* (2006.01)
*H04N 5/91* (2006.01)
*H04N 23/60* (2023.01)

(52) U.S. Cl.
CPC .............. *H04N 5/772* (2013.01); *H04N 5/91* (2013.01); *H04N 23/665* (2023.01)

(58) Field of Classification Search
CPC ........ H04N 5/772; H04N 5/91; H04N 23/665; H04N 9/8042; H04N 23/00; H04N 23/80;
(Continued)

(56) References Cited

U.S. PATENT DOCUMENTS

2007/0198546 A1    8/2007   Shintani
2011/0060774 A1*   3/2011   Shintani .................... G06T 1/00
                                                      707/822
(Continued)

FOREIGN PATENT DOCUMENTS

CN    102484692 A    5/2012
CN    103444170 A    12/2013
(Continued)

OTHER PUBLICATIONS

English language translation of the following: Office action dated Apr. 26, 2022 from the JPO in a Japanese patent application No. 2021-536855 corresponding to the instant patent application.
(Continued)

*Primary Examiner* — Yosef K Laekemariam
(74) *Attorney, Agent, or Firm* — SOLARIS Intellectual Property Group, PLLC

(57) ABSTRACT

An imaging element includes a storage portion that is incorporated in the imaging element and stores image data obtained by imaging, a control portion that is incorporated in the imaging element and controls storage of the image data in the storage portion and stores attribute information of the image data in the storage portion, an output portion that is incorporated in the imaging element and outputs the image data stored in the storage portion, and a reception portion that receives an instruction related to the attribute information, in which the output portion outputs the attribute information corresponding to the instruction received by the reception portion.

20 Claims, 30 Drawing Sheets

(58) Field of Classification Search
CPC ........ H04N 25/70; H04N 23/50; H04N 25/75; H04N 5/77; H04N 23/60
See application file for complete search history.

(56) References Cited

U.S. PATENT DOCUMENTS

| | | |
|---|---|---|
| 2012/0154419 A1 | 6/2012 | Nagata et al. |
| 2012/0314900 A1* | 12/2012 | Tyomkin ............... G01S 3/7865 382/103 |
| 2014/0015946 A1 | 1/2014 | Yanagidate |
| 2014/0092291 A1 | 4/2014 | Aoshima et al. |
| 2015/0015760 A1* | 1/2015 | Tsunai ................... H04N 25/79 348/311 |
| 2015/0163403 A1 | 6/2015 | Wakabayashi |
| 2016/0050387 A1 | 2/2016 | Kitahara et al. |
| 2017/0118422 A1 | 4/2017 | Tsunai |
| 2018/0227512 A1 | 8/2018 | Tsunai |
| 2020/0236307 A1 | 7/2020 | Tsunai |
| 2021/0337141 A1 | 10/2021 | Tsunai |

FOREIGN PATENT DOCUMENTS

| | | |
|---|---|---|
| CN | 103716451 A | 4/2014 |
| CN | 105229999 A | 1/2016 |
| JP | 2006-309745 A | 11/2006 |
| JP | 2011-119934 A | 6/2011 |
| JP | 2018-6979 A | 1/2018 |
| WO | 2013/145765 A1 | 10/2013 |
| WO | 2014/007004 A1 | 1/2014 |

OTHER PUBLICATIONS

International Search Report issued in International Application No. PCT/JP2020/025834 on Sep. 29, 2020.
Written Opinion of the ISA issued in International Application No. PCT/JP2020/025834 on Sep. 29, 2020.
English language translation of the following: Office action dated Nov. 8, 2023 from the SIPO in a Chinese patent application No. 202080052874.5 corresponding to the instant patent application. This office action translation is submitted now in order to supplement the understanding of the cited references which are being disclosed in the instant Information Disclosure Statement.

* cited by examiner

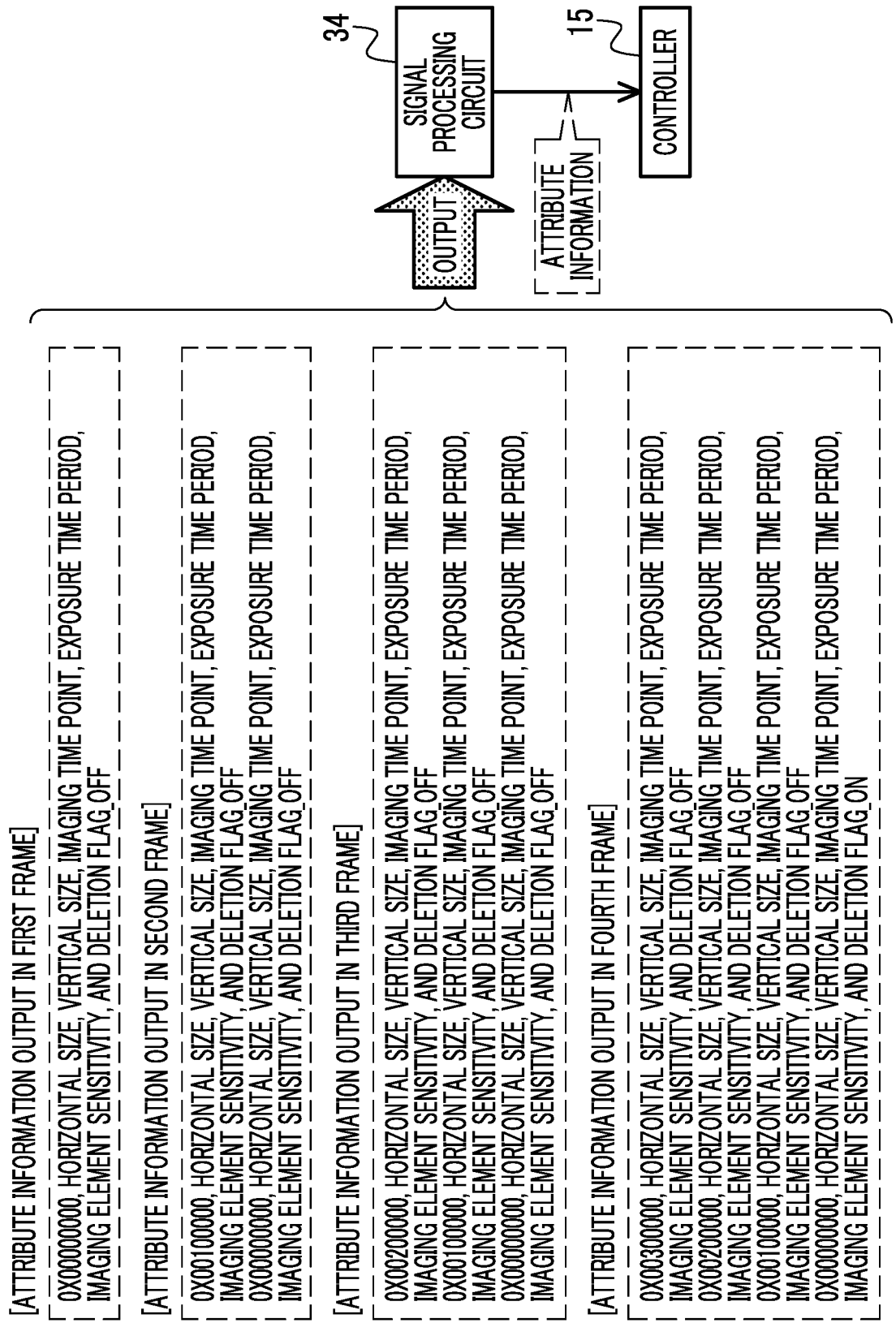

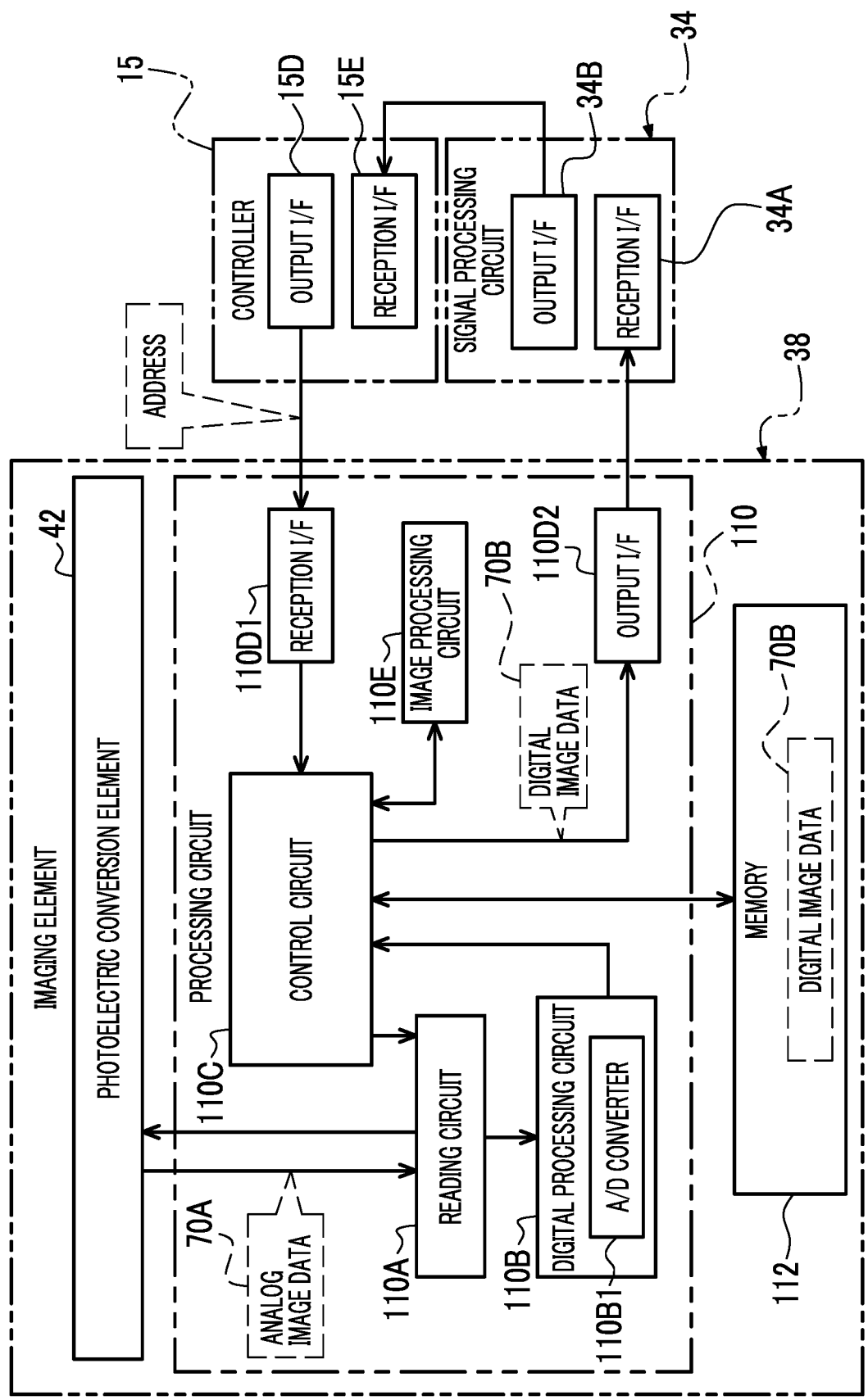

FIG. 16A

[ATTRIBUTE INFORMATION OUTPUT IN FIRST FRAME]
```
0X00000000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
```

[ATTRIBUTE INFORMATION OUTPUT IN SECOND FRAME]
```
0X00100000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
0X00000000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
```

[ATTRIBUTE INFORMATION OUTPUT IN THIRD FRAME]
```
0X00200000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
0X00100000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
0X00000000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
```

[ATTRIBUTE INFORMATION OUTPUT IN FOURTH FRAME]
```
0X00300000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
0X00200000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
0X00100000, HORIZONTAL SIZE, VERTICAL SIZE, IMAGING TIME POINT, EXPOSURE TIME PERIOD,
IMAGING ELEMENT SENSITIVITY, AND DELETION FLAG_OFF
0X00000000, HORIZONTAL SIZE, VERTICAL SIZE, IMAGING TIME POINT, EXPOSURE TIME PERIOD,
IMAGING ELEMENT SENSITIVITY, AND DELETION FLAG_ON
0X00400000, HORIZONTAL SIZE, VERTICAL SIZE, IMAGING TIME POINT, EXPOSURE TIME PERIOD,
IMAGING ELEMENT SENSITIVITY, AND COMPRESSION SPECIFYING INFORMATION
```

FIG. 16B

[ATTRIBUTE INFORMATION OUTPUT IN FIFTH FRAME]

0X00000000, HORIZONTAL SIZE, VERTICAL SIZE, IMAGING TIME POINT, EXPOSURE TIME PERIOD, IMAGING ELEMENT SENSITIVITY, AND DELETION FLAG_OFF
0X00300000, HORIZONTAL SIZE, VERTICAL SIZE, IMAGING TIME POINT, EXPOSURE TIME PERIOD, IMAGING ELEMENT SENSITIVITY, AND DELETION FLAG_OFF
0X00200000, HORIZONTAL SIZE, VERTICAL SIZE, IMAGING TIME POINT, EXPOSURE TIME PERIOD, IMAGING ELEMENT SENSITIVITY, AND DELETION FLAG_OFF
0X00100000, HORIZONTAL SIZE, VERTICAL SIZE, IMAGING TIME POINT, EXPOSURE TIME PERIOD, IMAGING ELEMENT SENSITIVITY, AND DELETION FLAG_ON
0X00500000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION
0X00400000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION

[ATTRIBUTE INFORMATION OUTPUT IN SIXTH FRAME]

0X00100000, HORIZONTAL SIZE, VERTICAL SIZE, IMAGING TIME POINT, EXPOSURE TIME PERIOD, IMAGING ELEMENT SENSITIVITY, AND DELETION FLAG_OFF
0X00000000, HORIZONTAL SIZE, VERTICAL SIZE, IMAGING TIME POINT, EXPOSURE TIME PERIOD, IMAGING ELEMENT SENSITIVITY, AND DELETION FLAG_OFF
0X00300000, HORIZONTAL SIZE, VERTICAL SIZE, IMAGING TIME POINT, EXPOSURE TIME PERIOD, IMAGING ELEMENT SENSITIVITY, AND DELETION FLAG_OFF
0X00200000, HORIZONTAL SIZE, VERTICAL SIZE, IMAGING TIME POINT, EXPOSURE TIME PERIOD, IMAGING ELEMENT SENSITIVITY, AND DELETION FLAG_ON
0X00540000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION
0X00500000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION
0X00400000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION

FIG. 17A

[ATTRIBUTE INFORMATION OUTPUT IN FIRST FRAME]

0X00000000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF

[ATTRIBUTE INFORMATION OUTPUT IN SECOND FRAME]

0X00100000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF
0X00000000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF

[ATTRIBUTE INFORMATION OUTPUT IN THIRD FRAME]

0X00200000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF
0X00100000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF
0X00000000, HORIZONTAL SIZE, VERTICAL SIZE, IMAGING TIME POINT, EXPOSURE TIME PERIOD,
IMAGING ELEMENT SENSITIVITY, DELETION FLAG_ON, AND COMPRESSION SCHEDULE FLAG_ON

[ATTRIBUTE INFORMATION OUTPUT IN FOURTH FRAME]

0X00300000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF
0X00200000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF
0X00100000, HORIZONTAL SIZE, VERTICAL SIZE, IMAGING TIME POINT, EXPOSURE TIME PERIOD,
IMAGING ELEMENT SENSITIVITY, DELETION FLAG_OFF, AND COMPRESSION SCHEDULE FLAG_OFF
0X00000000, HORIZONTAL SIZE, VERTICAL SIZE, IMAGING TIME POINT, EXPOSURE TIME PERIOD,
IMAGING ELEMENT SENSITIVITY, DELETION FLAG_ON, AND COMPRESSION SCHEDULE FLAG_ON
0X00400000, HORIZONTAL SIZE, VERTICAL SIZE, IMAGING TIME POINT, EXPOSURE TIME PERIOD,
IMAGING ELEMENT SENSITIVITY, AND COMPRESSION SPECIFYING INFORMATION

FIG. 17B

[ATTRIBUTE INFORMATION OUTPUT IN FIFTH FRAME]

0X00000000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00300000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00200000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00100000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON
0X00500000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION
0X00400000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION

[ATTRIBUTE INFORMATION OUTPUT IN SIXTH FRAME]

0X00100000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00000000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00300000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00200000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON
0X00540000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION
0X00500000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION
0X00400000, HORIZONTAL SIZE, VERTICAL SIZE, IMAGING TIME POINT, EXPOSURE TIME PERIOD, IMAGING ELEMENT SENSITIVITY, AND COMPRESSION SPECIFYING INFORMATION

FIG. 18A

[ATTRIBUTE INFORMATION OUTPUT IN FOURTH FRAME]

0X00300000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00200000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00100000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00000000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG ON
0X00400000, HORIZONTAL SIZE, VERTICAL SIZE, IMAGING TIME POINT, EXPOSURE TIME PERIOD, IMAGING ELEMENT SENSITIVITY, COMPRESSION SPECIFYING INFORMATION, AND COMPRESSION FORMAT SPECIFYING INFORMATION

[ATTRIBUTE INFORMATION OUTPUT IN FIFTH FRAME]

0X00000000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00300000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00200000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00100000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00500000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG ON
IMAGING ELEMENT SENSITIVITY, COMPRESSION SPECIFYING INFORMATION, COMPRESSION FORMAT SPECIFYING INFORMATION
0X00400000, HORIZONTAL SIZE, VERTICAL SIZE, IMAGING TIME POINT, EXPOSURE TIME PERIOD, IMAGING ELEMENT SENSITIVITY, COMPRESSION SPECIFYING INFORMATION, AND COMPRESSION FORMAT SPECIFYING INFORMATION

FIG. 18B

[ATTRIBUTE INFORMATION OUTPUT IN SIXTH FRAME]
0X00100000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00000000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00300000, HORIZONTAL SIZE, VERTICAL SIZE, IMAGING TIME POINT, EXPOSURE TIME PERIOD, IMAGING ELEMENT SENSITIVITY, DELETION FLAG_OFF, AND COMPRESSION SCHEDULE FLAG_OFF
0X00200000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON
0X00540000, HORIZONTAL SIZE, VERTICAL SIZE, IMAGING TIME POINT, EXPOSURE TIME PERIOD, IMAGING ELEMENT SENSITIVITY, COMPRESSION SPECIFYING INFORMATION AND COMPRESSION FORMAT SPECIFYING INFORMATION
0X00500000, HORIZONTAL SIZE, VERTICAL SIZE, IMAGING TIME POINT, EXPOSURE TIME PERIOD, IMAGING ELEMENT SENSITIVITY, COMPRESSION SPECIFYING INFORMATION AND COMPRESSION FORMAT SPECIFYING INFORMATION
0X00400000, HORIZONTAL SIZE, VERTICAL SIZE, IMAGING TIME POINT, EXPOSURE TIME PERIOD, IMAGING ELEMENT SENSITIVITY, COMPRESSION SPECIFYING INFORMATION, AND COMPRESSION FORMAT SPECIFYING INFORMATION

FIG. 20

[ATTRIBUTE INFORMATION OUTPUT IN FIRST FRAME]
0X00000000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON

[ATTRIBUTE INFORMATION OUTPUT IN SECOND FRAME]
0X00100000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON

[ATTRIBUTE INFORMATION OUTPUT IN THIRD FRAME]
0X00200000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON

[ATTRIBUTE INFORMATION OUTPUT IN FOURTH FRAME]
0X00300000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON

[ATTRIBUTE INFORMATION OUTPUT IN FIFTH FRAME]
0X00400000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON

[ATTRIBUTE INFORMATION OUTPUT IN SIXTH FRAME]
0X00500000, HORIZONTAL SIZE, VERTICAL SIZE, IMAGING TIME POINT, EXPOSURE TIME PERIOD, IMAGING ELEMENT SENSITIVITY, DELETION FLAG_ON, AND COMPRESSION SCHEDULE FLAG_ON

FIG. 21

[ATTRIBUTE INFORMATION OUTPUT IN FIRST FRAME]
0X00000000, HORIZONTAL SIZE, VERTICAL SIZE, IMAGING TIME POINT, EXPOSURE TIME PERIOD, AND IMAGING ELEMENT SENSITIVITY

[ATTRIBUTE INFORMATION OUTPUT IN SECOND FRAME]
0X00100000, HORIZONTAL SIZE, VERTICAL SIZE, IMAGING TIME POINT, EXPOSURE TIME PERIOD, AND IMAGING ELEMENT SENSITIVITY

[ATTRIBUTE INFORMATION OUTPUT IN THIRD FRAME]
0X00200000, HORIZONTAL SIZE, VERTICAL SIZE, IMAGING TIME POINT, EXPOSURE TIME PERIOD, AND IMAGING ELEMENT SENSITIVITY

[ATTRIBUTE INFORMATION OUTPUT IN FOURTH FRAME]
0X00300000, HORIZONTAL SIZE, VERTICAL SIZE, IMAGING TIME POINT, EXPOSURE TIME PERIOD, AND IMAGING ELEMENT SENSITIVITY

[ATTRIBUTE INFORMATION OUTPUT IN FIFTH FRAME]
0X00400000, HORIZONTAL SIZE, VERTICAL SIZE, IMAGING TIME POINT, EXPOSURE TIME PERIOD, AND IMAGING ELEMENT SENSITIVITY

[ATTRIBUTE INFORMATION OUTPUT IN SIXTH FRAME]
0X00500000, HORIZONTAL SIZE, VERTICAL SIZE, IMAGING TIME POINT, EXPOSURE TIME PERIOD, AND IMAGING ELEMENT SENSITIVITY

IMAGING ELEMENT, IMAGING APPARATUS, OPERATION METHOD OF IMAGING ELEMENT, AND PROGRAM

CROSS-REFERENCE TO RELATED APPLICATIONS

This application is a continuation application of International Application No. PCT/JP2020/025834, filed Jul. 1, 2020, the disclosure of which is incorporated herein by reference in its entirety. Further, this application claims priority from Japanese Patent Application No. 2019-138238, filed Jul. 26, 2019, the disclosure of which is incorporated herein by reference in its entirety.

BACKGROUND

1. Technical Field

The technology of the present disclosure relates to an imaging element, an imaging apparatus, an operation method of an imaging element, and a program.

2. Related Art

WO2014/007004A discloses a solid-state imaging element comprising a signal processing portion that includes an AD converter digitizing an analog pixel signal read out into a signal line from each pixel of a pixel array portion and transfers digitized pixel data at a first speed higher than a frame rate, a memory portion that holds the pixel data transferred from the signal processing portion, a data processing portion that reads out the pixel data from the memory portion at a second speed lower than the first speed, and a control portion that performs a control for pausing an operation of a current source connected to the signal line and an operation of at least the AD converter of the signal processing portion in a case of reading out the pixel data from the memory portion.

The solid-state imaging element disclosed in WO2014/007004A has a structure in which the signal processing portion, the memory portion, the data processing portion, and the control portion are formed in at least one chip different from a chip in which the pixel array portion is formed, and the chip in which the pixel array portion is formed and at least the other chip are laminated. In addition, in the solid-state imaging element disclosed in WO2014/007004A, the data processing portion includes a decoder that designates a column address for the memory portion, and a sense amplifier that reads out the pixel data at the designated address. The data processing portion reads out the pixel data from the memory portion through the sense amplifier and the decoder.

WO2013/145765A discloses an imaging unit comprising an imaging portion that includes a first group including one or more pixels and a second group including one or more pixels different from the pixels constituting the first group, and a control portion that outputs each pixel signal by executing electric charge accumulation in the second group a different number of times from the first group in a period of executing the electric charge accumulation once in the first group.

In the imaging unit disclosed in WO2013/145765A, an imaging chip including the imaging portion and a signal processing chip including a processing circuit that processes the pixel signals are electrically connected by a laminated structure. In addition, a memory chip including a pixel memory storing the pixel signals is electrically connected by the laminated structure. In addition, in the imaging unit disclosed in WO2013/145765A, the control portion reads out a pixel signal of a designated group from the pixel memory and hands the pixel signal over to an image processing portion in accordance with a handover request from an external circuit with respect to the designated group in a set of groups including the second group. In addition, the imaging unit disclosed in WO2013/145765A comprises a data transfer interface that transfers the pixel signal in accordance with the handover request. Transfer of the pixel signal by the data transfer interface employs at least one of a double data rate method, an address designation method, a burst transfer method, a bus method, or a serial method. Furthermore, in the imaging unit disclosed in WO2013/145765A, the control portion hands each pixel signal over to the image processing portion in a case where each pixel signal with respect to a plurality of times of the electric charge accumulation is stored in the pixel memory.

SUMMARY

One embodiment according to the technology of the present disclosure provides an imaging element, an imaging apparatus, an operation method of an imaging element, and a program that can selectively acquire necessary image data from the imaging element.

A first aspect according to the technology of the present disclosure is an imaging element comprising a storage portion that is incorporated in the imaging element and stores image data obtained by imaging, a control portion that is incorporated in the imaging element and controls storage of the image data in the storage portion and stores attribute information of the image data in the storage portion, an output portion that is incorporated in the imaging element and outputs the image data stored in the storage portion, and a reception portion that receives an instruction related to the attribute information, in which output portion outputs the attribute information corresponding to the instruction received by the reception portion.

A second aspect according to the technology of the present disclosure is the imaging element according to the first aspect, in which the output portion outputs the attribute information at a timing of reception of the instruction by the reception portion.

A third aspect according to the technology of the present disclosure is the imaging element according to the first or second aspect, in which the instruction is a frame synchronization signal from an outside.

A fourth aspect according to the technology of the present disclosure is the imaging element according to any one of the first to third aspects, in which the output portion outputs the attribute information related to most recent image data among pieces of the image data stored in the storage portion.

A fifth aspect according to the technology of the present disclosure is the imaging element according to the fourth aspect, in which the output portion outputs the attribute information related to the most recent image data at a timing of reception of the instruction by the reception portion.

A sixth aspect according to the technology of the present disclosure is the imaging element according to any one of the first to fifth aspects, in which the output portion is capable of outputting the attribute information of each of a plurality of pieces of the image data, and the attribute information is output in an imaging order by the output portion.

A seventh aspect according to the technology of the present disclosure is the imaging element according to any one of the first to sixth aspects, in which the attribute information is information including at least one of an address, an image size, an imaging time point, or an imaging condition.

An eighth aspect according to the technology of the present disclosure is the imaging element according to any one of the first to seventh aspects, in which in a case where the image data is deleted from the storage portion along with subsequent imaging, the attribute information output from the output portion is information including deletion information indicating that the image data is deleted from the storage portion along with the subsequent imaging.

A ninth aspect according to the technology of the present disclosure is the imaging element according to the eighth aspect, in which in a case where the image data is deleted from the storage portion, the control portion deletes, from the storage portion, the attribute information related to deletion target image data that is the image data of a deletion target in the storage portion, and deletes the deletion target image data from the storage portion.

A tenth aspect according to the technology of the present disclosure is the imaging element according to any one of the first to ninth aspects, further comprising a compression circuit that compresses the image data, in which the control portion stores the image data of a predetermined number of frames in the storage portion, stores compressed image data obtained by compressing the image data using the compression circuit in the storage portion, and associates the attribute information related to the compressed image data with compression specifying information for specifying compression of the image data in the compressed image data.

An eleventh aspect according to the technology of the present disclosure is the imaging element according to the tenth aspect, in which in a case where the compressed image data is stored in the storage portion, the attribute information output from the output portion is information including compression schedule information indicating that the compressed image data is scheduled to be stored in the storage portion.

A twelfth aspect according to the technology of the present disclosure is the imaging element according to the tenth or eleventh aspect, in which the attribute information output from the output portion is information including information for specifying a compression format of the compressed image data.

A thirteenth aspect according to the technology of the present disclosure is the imaging element according to any one of the first to twelfth aspects, in which the instruction includes an output amount of the attribute information by the output portion, and the output portion outputs the attribute information in the output amount.

A fourteenth aspect according to the technology of the present disclosure is the imaging element according to the thirteenth aspect, in which the output amount is defined as the number of frames of the image data.

A fifteenth aspect according to the technology of the present disclosure is the imaging element according to any one of the first to fourteenth aspects, further comprising a receiving portion that receives the attribute information transmitted from a rear stage circuit positioned on a rear stage of the imaging element, in which the control portion acquires the image data from the storage portion in accordance with the attribute information received by the receiving portion and outputs the acquired image data to the rear stage circuit using the output portion.

A sixteenth aspect according to the technology of the present disclosure is the imaging element according to any one of the first to fifteenth aspects, in which the output portion includes a first output portion and a second output portion, the first output portion outputs the image data, and the second output portion outputs the attribute information.

A seventeenth aspect according to the technology of the present disclosure is the imaging element according to any one of the first to sixteenth aspects, in which at least a photoelectric conversion element and the storage portion are formed in one chip.

An eighteenth aspect according to the technology of the present disclosure is the imaging element according to the seventeenth aspect, in which the imaging element is a laminated imaging element in which the photoelectric conversion element is laminated with the storage portion.

A nineteenth aspect according to the technology of the present disclosure is an imaging apparatus comprising the imaging element according to any one of the first to eighteenth aspects, and a control device that performs at least one of a control for displaying an image based on the image data output by the output portion on a display portion or a control for storing the image data output by the output portion in a storage device.

A twentieth aspect according to the technology of the present disclosure is an operation method of an imaging element incorporating a storage portion that stores image data obtained by imaging, the operation method comprising controlling storage of the image data in the storage portion, storing attribute information of the image data in the storage portion, outputting the image data stored in the storage portion, receiving an instruction related to the attribute information, and outputting the attribute information corresponding to the received instruction.

A twenty-first aspect according to the technology of the present disclosure is a program for a computer applied to an imaging element incorporating a storage portion that stores image data obtained by imaging, the program causing the computer to execute a process comprising controlling storage of the image data in the storage portion, storing attribute information of the image data in the storage portion, outputting the image data stored in the storage portion, receiving an instruction related to the attribute information, and outputting the attribute information corresponding to the received instruction.

BRIEF DESCRIPTION OF THE DRAWINGS

Exemplary embodiments of the technology of the disclosure will be described in detail based on the following figures, wherein:

FIG. 11A is a conceptual diagram illustrating an example of a content of the attribute information output from an output I/F of the imaging element in a first frame to a fourth frame;

FIG. 12 is a block diagram illustrating an example of a hardware configuration of the electric system of the imaging element included in the imaging apparatus according to the embodiment, and is a block diagram for describing an example of a form of outputting digital image data from the imaging element;

FIG. 16A is a conceptual diagram illustrating an example of the content of the attribute information output from the output I/F of the imaging element in the first frame to the fourth frame in a case where the compression processing is performed on the digital image data from the fourth frame;

FIG. 16B is a conceptual diagram illustrating an example of the content of the attribute information output from the output I/F of the imaging element in the fifth frame and the sixth frame in a case where the compression processing is performed on the digital image data from the fourth frame;

FIG. 17A is a conceptual diagram illustrating an example of the content of the attribute information that includes a compression schedule flag indicating whether or not the digital image data of one frame is scheduled to be compressed along with subsequent imaging, and is output from the output I/F of the imaging element in the first frame to the fourth frame;

FIG. 17B is a conceptual diagram illustrating an example of the content of the attribute information that includes the compression schedule flag indicating whether or not the digital image data of one frame is scheduled to be compressed along with the subsequent imaging, and is output from the output I/F of the imaging element in the fifth frame and the sixth frame;

FIG. 18A is a conceptual diagram illustrating an example of the content of the attribute information that includes the compression schedule flag indicating whether or not the digital image data of one frame is scheduled to be compressed along with the subsequent imaging, and compression format specifying information, and is output from the output I/F of the imaging element in the fourth frame and the fifth frame;

FIG. 18B is a conceptual diagram illustrating an example of the content of the attribute information that includes the compression schedule flag indicating whether or not the digital image data of one frame is scheduled to be compressed along with the subsequent imaging, and the compression format specifying information, and is output from the output I/F of the imaging element in the sixth frame;

FIG. 20 is a conceptual diagram illustrating an example of the content of the attribute information output in the first frame to the sixth frame in a case where the attribute information output for each frame is attribute information related to the digital image data of one frame;

FIG. 21 is a conceptual diagram illustrating an example of the content of the attribute information that is output in the first frame to the sixth frame in a case where the attribute information output for each frame is the attribute information related to the digital image data of one frame, and does not include a deletion flag and the compression schedule flag;

DETAILED DESCRIPTION

Hereinafter, an example of an embodiment of an imaging apparatus according to the embodiment of the technology of the present disclosure will be described in accordance with the appended drawings.

First, words used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory". The abbreviation LSI stands for "Large-Scale Integrated circuit". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation LVDS stands for "Low Voltage Differential Signaling". The abbreviation PCI-e stands for "Peripheral Component Interconnect Express". The abbreviation SATA stands for "Serial Advanced Technology Attachment". The abbreviation SLVS-EC stands for "Scalable Low Signaling with Embedded Clock". The abbreviation MIPI stands for "Mobile Industry Processor Interface". The abbreviation fps stands for "frame per second". The abbreviation FIFO stands for "First in First out". The abbreviation MPEG stands for "Moving Picture Experts Group". The abbreviation JPEG stands for "Joint Photographic Experts Group". The abbreviation TIFF stands for "Tagged Image File Format". The abbreviation BMP stands for "Bitmap". The abbreviation PNG stands for "Portable Network Graphics". The abbreviation GIF stands for "Graphics Interchange Format".

Figure 1:
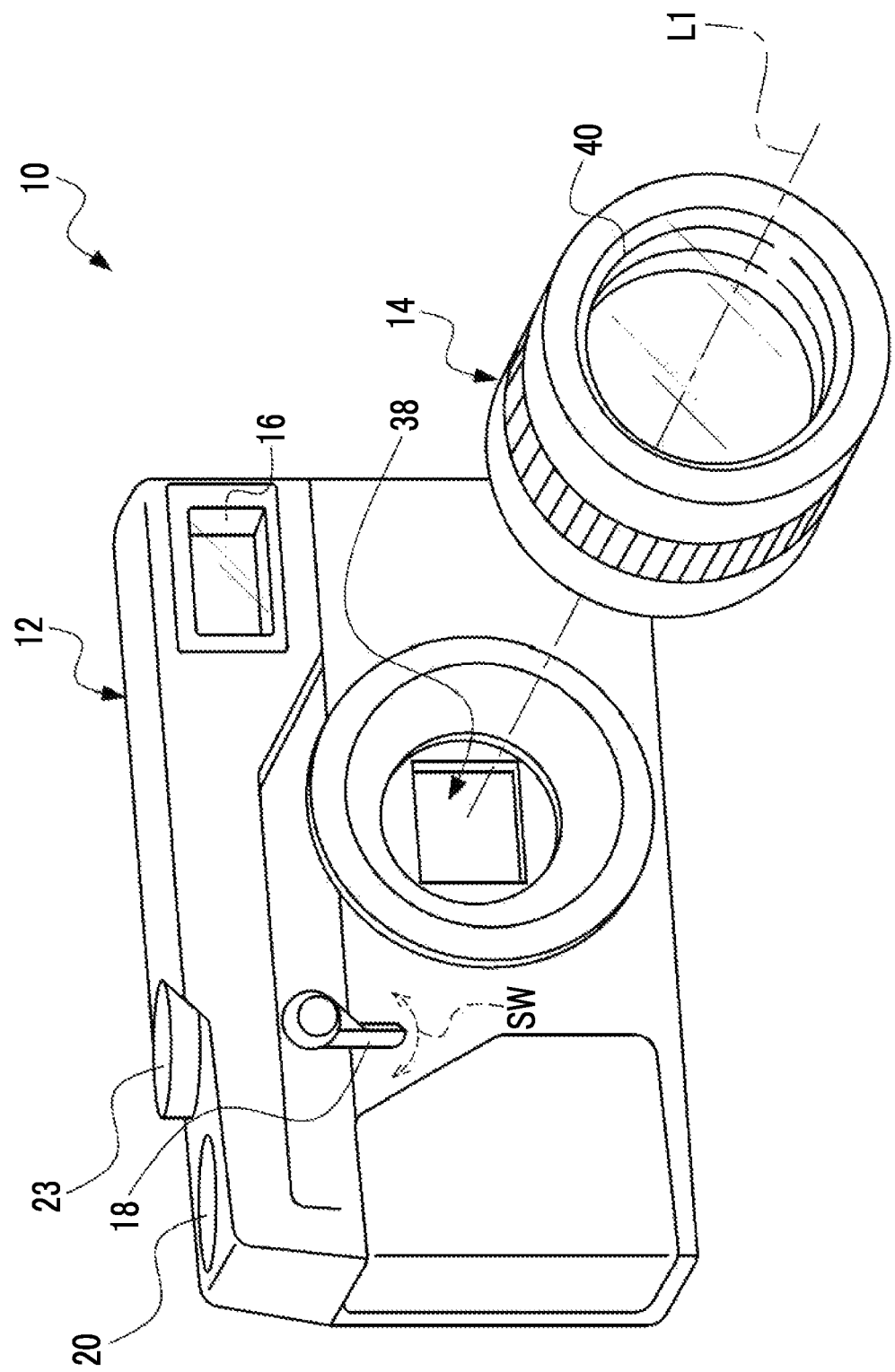
FIG. 1 is a perspective view illustrating an example of an exterior of an imaging apparatus according to an embodiment.

As illustrated in FIG. 1 as an example, an imaging apparatus 10 is a digital camera of an interchangeable lens type that does not include a reflex mirror. The imaging apparatus 10 comprises an imaging apparatus main body 12 and an interchangeable lens 14 that is interchangeably mounted on the imaging apparatus main body 12. Here, while the digital camera of the interchangeable lens type that does not include the reflex mirror is exemplified as an example of the imaging apparatus 10, the technology of the present disclosure is not limited thereto. The imaging apparatus 10 may be a digital camera of other types such as a fixed lens type.

An imaging element 38 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 38. Image data (for example, refer to FIG. 4 and FIG. 5) that indicates an image of the subject is generated by the imaging element 38.

A hybrid finder (registered trademark) 16 is disposed in the imaging apparatus main body 12. For example, the hybrid finder 16 here refers to a finder in which an optical viewfinder (hereinafter, referred to as the OVF) and an electronic viewfinder (hereinafter, referred to as the EVF) are selectively used. The abbreviation OVF stands for "optical viewfinder". In addition, the abbreviation EVF stands for "electronic viewfinder".

A finder switching lever 18 is disposed on a front surface of the imaging apparatus main body 12. An optical image visible by the OVF and a live view image that is an electronic image visible by the EVF are switched by rotationally moving the finder switching lever 18 in a direction of arrow SW. The "live view image" here refers to a display motion picture image based on the image data obtained by imaging using the imaging element 38. The live view image is generally referred to as a live preview image. A release button 20 and a dial 23 are disposed on an upper surface of the imaging apparatus main body 12. The dial 23 operates in a case of setting an operation mode of an imaging system, an operation mode of a playback system, and the like. Accordingly, an imaging mode and a playback mode are selectively set as an operation mode in the imaging apparatus 10.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

Figure 2:
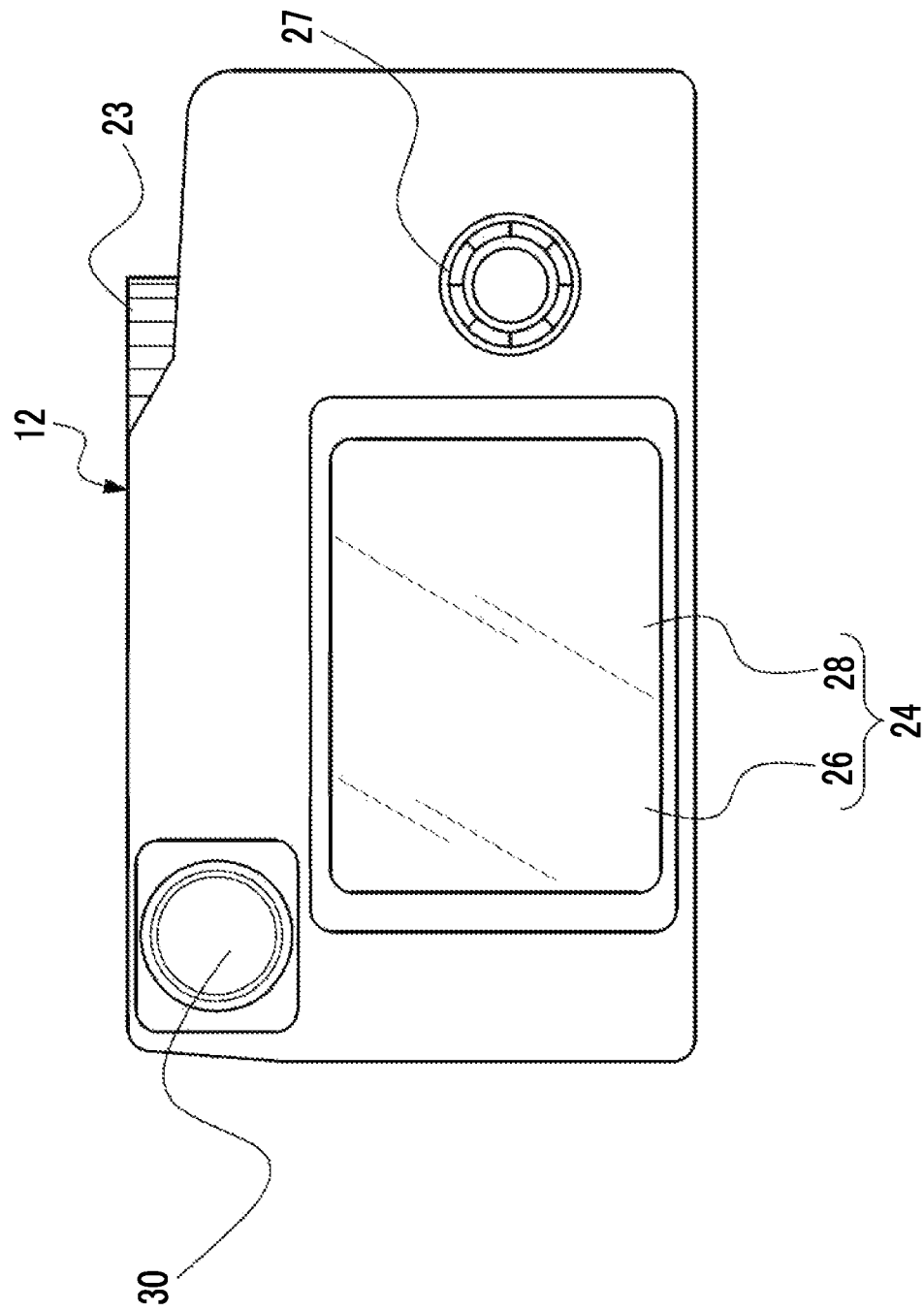
FIG. 2 is a rear view illustrating an example of the exterior on a rear surface side of the imaging apparatus illustrated in FIG. 1.

As illustrated in FIG. 2 as an example, a touch panel display 24, an instruction key 27, and a finder eyepiece portion 30 are disposed on a rear surface of the imaging apparatus main body 12.

Figure 4:
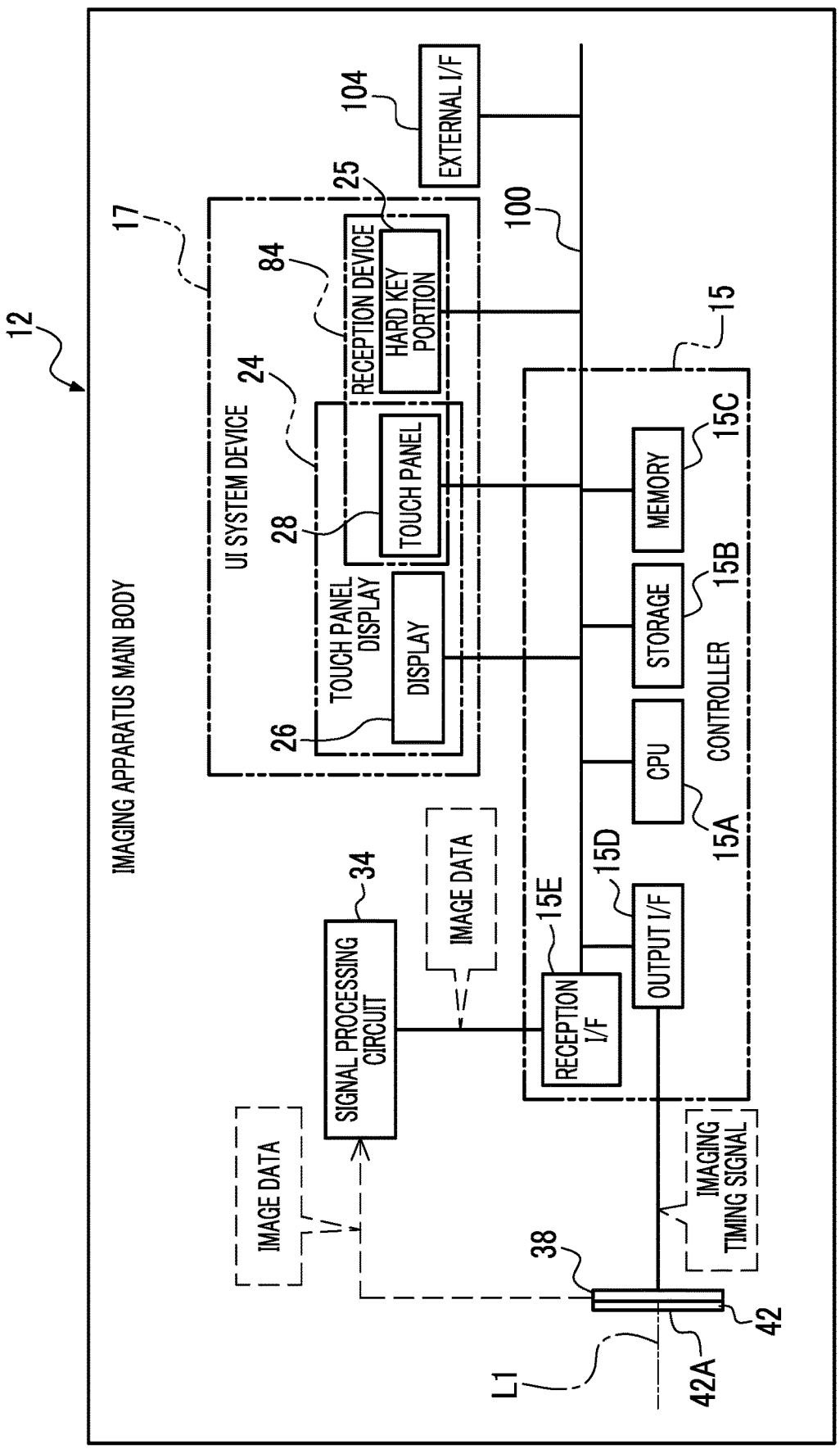
FIG. 4 is a block diagram illustrating an example of a hardware configuration of an electric system of an imaging apparatus main body included in the imaging apparatus according to the embodiment.

The touch panel display 24 comprises a display 26 and a touch panel 28 (refer to FIG. 4). A liquid crystal display is exemplified as an example of the display 26. Instead of the liquid crystal display, the display 26 may be a display of other types such as an organic EL display or an inorganic EL display. The display 26 and the EVF are an example of a "display portion (display)" according to the embodiment of the technology of the present disclosure. Display of the EVF is equivalent to display of the display 26 and thus, will not be described below. However, in the present specification, display on the display 26 can be substituted with display on the EVF.

The display 26 displays images, text information, and the like. The display 26 is used for displaying the live view image obtained by consecutive imaging in a case where the imaging apparatus 10 is in the imaging mode. In addition, the display 26 is used for displaying a still picture image obtained by imaging in a case where an imaging instruction for the still picture image is provided. Furthermore, the display 26 is used for displaying a playback image and displaying a menu screen and the like in a case where the imaging apparatus 10 is in the playback mode.

The touch panel 28 is a transmissive touch panel and is overlaid on a surface of a display region of the display 26. The touch panel 28 receives an instruction from a user by detecting a contact of an instruction object such as a finger or a stylus pen.

The instruction key 27 receives various instructions. For example, the "various instructions" here refer to various instructions such as an instruction to display a menu screen on which various menus can be selected, an instruction to select one or a plurality of menus, an instruction to confirm a selected content, an instruction to delete the selected content, zoom in, zoom out, and frame advance.

Figure 3:
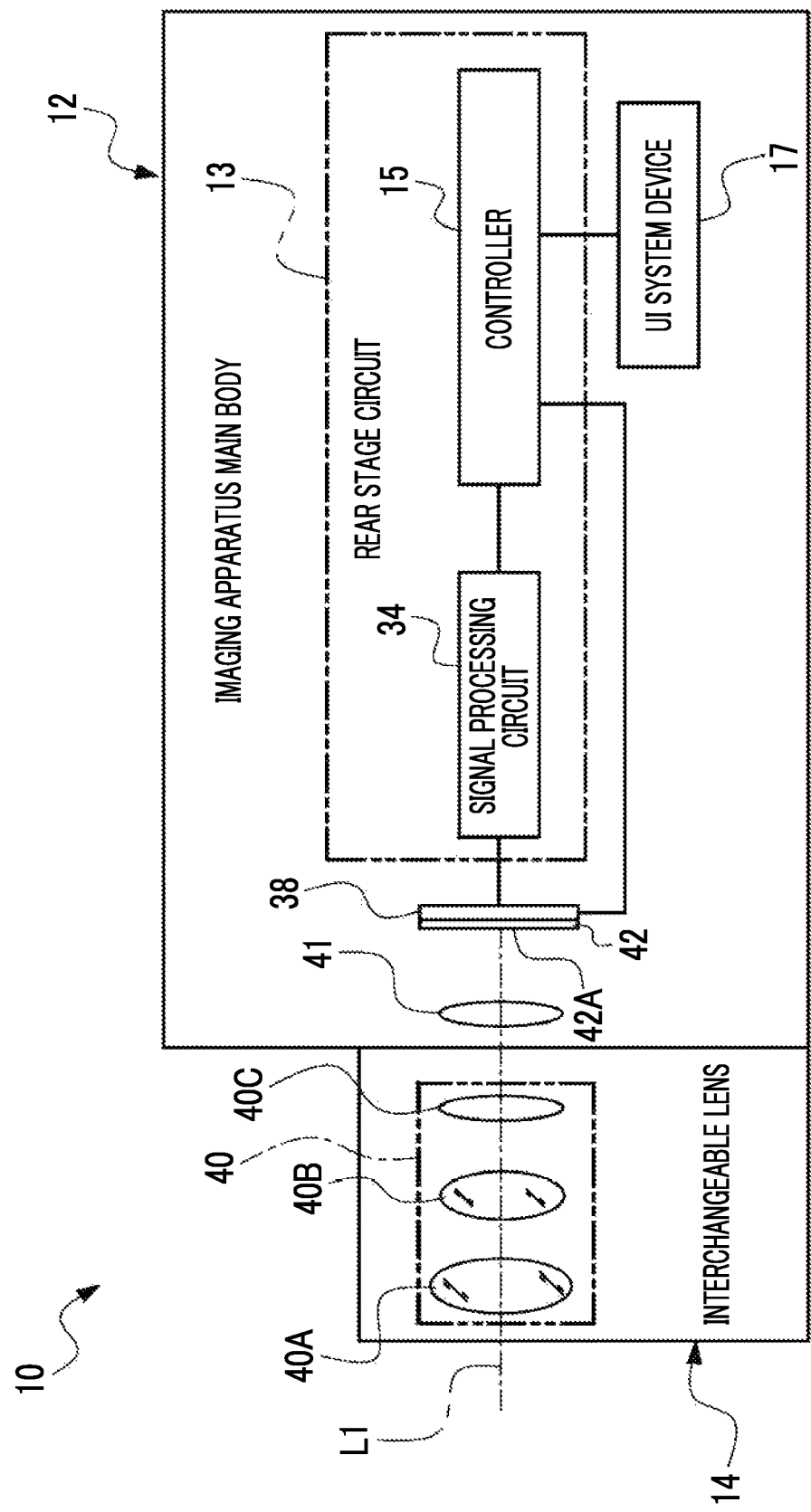
FIG. 3 is a block diagram illustrating an example of a configuration of the imaging apparatus according to the embodiment.

As illustrated in FIG. 3 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side (object side) to an imaging apparatus main body 12 side (image side). The focus lens 40B and the stop 40C operate by receiving motive power from a driving source (not illustrated) such as a motor. That is, the focus lens 40B and the stop 40C move along the optical axis L1 in response to the provided motive power. In addition, the stop 40C adjusts exposure by operating in response to the provided motive power.

The imaging apparatus main body 12 comprises a rear stage circuit 13, a UI system device 17, a mechanical shutter 41, and the imaging element 38. The rear stage circuit 13 is a circuit positioned on a rear stage of the imaging element 38. The rear stage circuit 13 includes a controller 15 and a signal processing circuit 34. The controller 15 is connected to the UI system device 17, the signal processing circuit 34, and the imaging element 38 and controls the entire electric system of the imaging apparatus 10.

The imaging element 38 comprises a photoelectric conversion element 42 having a light receiving surface 42A. In the present embodiment, the imaging element 38 is a CMOS image sensor. In addition, while the CMOS image sensor is illustrated here as the imaging element 38, the technology of the present disclosure is not limited thereto. For example, the technology of the present disclosure is also established in a case where the imaging element 38 is an image sensor of other types such as a CCD image sensor.

The mechanical shutter 41 operates by receiving motive power from a driving source (not illustrated) such as a motor. In a case where the interchangeable lens 14 is mounted on the imaging apparatus main body 12, the subject light showing the subject is transmitted through the imaging lens 40, and the image of the subject light is formed on the light receiving surface 42A through the mechanical shutter 41.

The UI system device 17 is a device that presents information to the user or receives the instruction from the user. The controller 15 acquires various types of information from the UI system device 17 and controls the UI system device 17.

The imaging element 38 is connected to the controller 15 and generates the image data indicating the image of the subject by imaging the subject under control of the controller 15.

The imaging element 38 is connected to the signal processing circuit 34. The signal processing circuit 34 is an LSI, specifically, a device including an ASIC and an FPGA. The controller 15 acquires various types of information from the signal processing circuit 34 and controls the imaging element 38. The imaging element 38 outputs the image data generated by the photoelectric conversion element 42 to the signal processing circuit 34 under control of the controller 15.

The signal processing circuit 34 performs various types of signal processing on the image data input from the imaging element 38. The various types of signal processing performed by the signal processing circuit 34 include well-known signal processing such as white balance adjustment, sharpness adjustment, gamma correction, color space conversion processing, and color difference correction.

The various types of signal processing performed by the signal processing circuit 34 may be performed in a distributed manner by the signal processing circuit 34 and the imaging element 38. That is, at least a part of the various types of signal processing performed by the signal processing circuit 34 may be performed by a processing circuit 110 of the imaging element 38.

In the present embodiment, a device including an ASIC and an FPGA is illustrated as the signal processing circuit 34. However, the technology of the present disclosure is not limited thereto. The signal processing circuit 34 may be a device including an ASIC, an FPGA, and/or a PLD.

In addition, the signal processing circuit 34 may be a computer including a CPU, a storage, and a memory. The "storage" here refers to a non-volatile storage device such as an SSD or an HDD. The "memory" here refers to a volatile storage device such as a DRAM or an SRAM. The number of CPUs included in the computer may be singular or plural. In addition, a GPU may be used instead of the CPU. In addition, the signal processing circuit 34 may be implemented by a combination of a hardware configuration and a software configuration.

As illustrated in FIG. 4 as an example, the controller 15 comprises a CPU 15A, a storage 15B, a memory 15C, an output I/F 15D, and a reception I/F 15E. The CPU 15A, the storage 15B, the memory 15C, the output I/F 15D, and the reception I/F 15E are connected through a busline 100. In the example illustrated in FIG. 4, for convenience of illustration, one busline is illustrated as the busline 100. However, the busline 100 includes a data bus, an address bus, a control bus, and the like.

The storage 15B stores various parameters and various programs. The storage 15B is a non-volatile storage device. Here, an EEPROM is employed as an example of the storage 15B. However, the technology of the present disclosure is not limited thereto. A mask ROM, an HDD, an SSD, or the like may be used. The memory 15C is a volatile storage device. Various types of information are temporarily stored in the memory 15C. The memory 15C is used as a work memory by the CPU 15A. Here, a DRAM is employed as an example of the memory 15C. However, the technology of the present disclosure is not limited thereto. A volatile storage device of other types such as an SRAM may be used. The CPU 15A is an example of a "control device" according to the embodiment of the technology of the present disclosure. The storage 15B is an example of a "storage device" according to the embodiment of the technology of the present disclosure.

The storage 15B stores various programs. The CPU 15A reads out the various programs from the storage 15B and loads the read various programs into the memory 15C. The CPU 15A controls the entire imaging apparatus 10 in accordance with the various programs loaded in the memory 15C.

The output I/F 15D is connected to the imaging element 38. The CPU 15A controls the imaging element 38 through the output I/F 15D. For example, the CPU 15A controls a timing of imaging performed by the imaging element 38 by supplying the imaging timing signal for defining the timing of imaging to the imaging element 38 through the output I/F 15D.

The reception I/F 15E is connected to the signal processing circuit 34. The CPU 15A exchanges various types of information with the signal processing circuit 34 through the reception I/F 15E.

The image data is input into the signal processing circuit 34 from the imaging element 38. The signal processing circuit 34 performs various types of signal processing (described in detail later) on the image data input from the imaging element 38. The signal processing circuit 34 outputs the image data on which the various types of signal processing are performed, to the reception I/F 15E. The reception I/F 15E receives the image data from the signal processing circuit 34 and transfers the received image data to the CPU 15A.

An external I/F 104 is connected to the busline 100. The external I/F 104 is a communication device configured with a circuit. Here, while the device configured with the circuit is employed as the external I/F 104, the device is merely an example. The external I/F 104 may be a device including an ASIC, an FPGA, and/or a PLD. In addition, the external I/F 104 may be implemented by a combination of a hardware configuration and a software configuration.

A USB interface is an example of the external I/F 104. An external apparatus (not illustrated) such as a memory card controller, a smart device, a personal computer, a server, a USB memory, and/or a memory card can be connected to the external I/F 104. The external I/F 104 controls exchange of various types of information between the CPU 15A and the external apparatus. The external apparatus directly or indirectly connected to the external I/F 104, that is, the external apparatus such as the smart device, the personal computer, the server, the USB memory, and/or the memory card is an example of the "storage device" according to the embodiment of the technology of the present disclosure.

A UI system device 17 comprises the touch panel display 24 and a reception device 84. The display 26 and the touch panel 28 are connected to the busline 100. Accordingly, the CPU 15A displays various types of information on the display 26 and operates in accordance with various instructions received by the touch panel 28.

The reception device 84 comprises a hard key portion 25. The hard key portion 25 includes a plurality of hard keys and includes the release button 20 (refer to FIG. 1), the dial 23 (refer to FIG. 1 and FIG. 2), and the instruction key 27 (refer to FIG. 2). The hard key portion 25 is connected to the busline 100, and the CPU 15A acquires an instruction received by the hard key portion 25 and operates in accordance with the acquired instruction.

Figure 5:
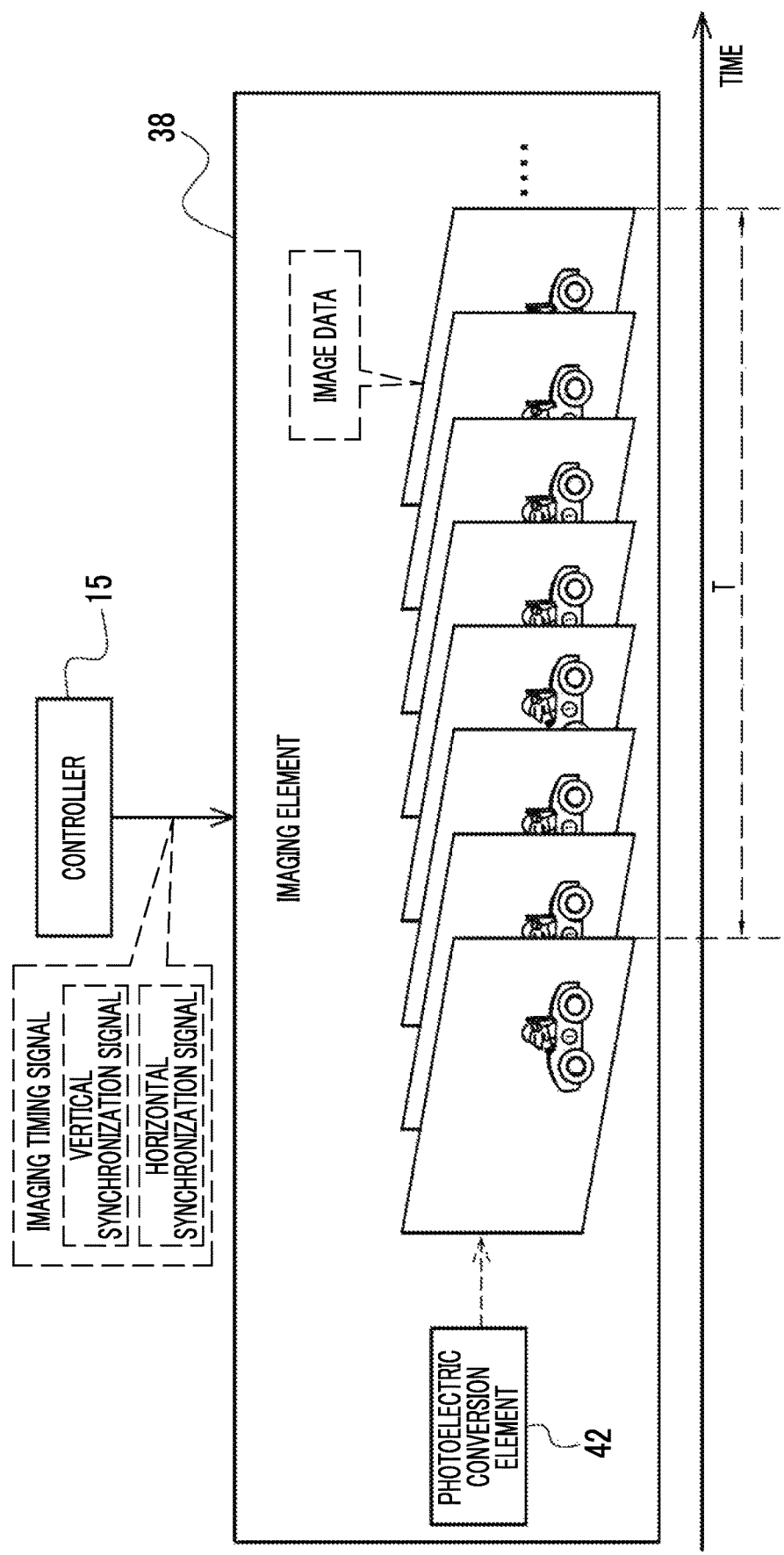
FIG. 5 is a conceptual diagram for describing a frame rate of an imaging element included in the imaging apparatus according to the embodiment.

As illustrated in FIG. 5 as an example, an imaging timing signal is input into the imaging element 38 from the controller 15. The imaging timing signal includes a vertical synchronization signal and a horizontal synchronization signal. The vertical synchronization signal is a synchronization signal for defining a start timing of reading of the image data for each frame from the photoelectric conversion element 42. The horizontal synchronization signal is a synchronization signal for defining a start timing of reading of the image data for each horizontal line from the photoelectric conversion element 42. The imaging element 38 reads out the image data from the photoelectric conversion element 42 in accordance with a frame rate decided in accordance with the vertical synchronization signal input from the controller 15. The vertical synchronization signal is an example of an "instruction related to attribute information" and a "frame synchronization signal from an outside" according to the embodiment of the technology of the present disclosure. The controller 15 is an example of the "outside" according to the embodiment of the technology of the present disclosure.

In the example illustrated in FIG. 5, a frame rate at which eight frames are read out from the photoelectric conversion element 42 within a period T is illustrated as the frame rate of the imaging element 38. Here, 120 fps is exemplified as a specific example of the frame rate. However, the technology of the present disclosure is not limited thereto. A frame rate (for example, 240 fps) exceeding 120 fps may be used, or a frame rate (for example, 60 fps) less than 120 fps may be used.

Figure 6:
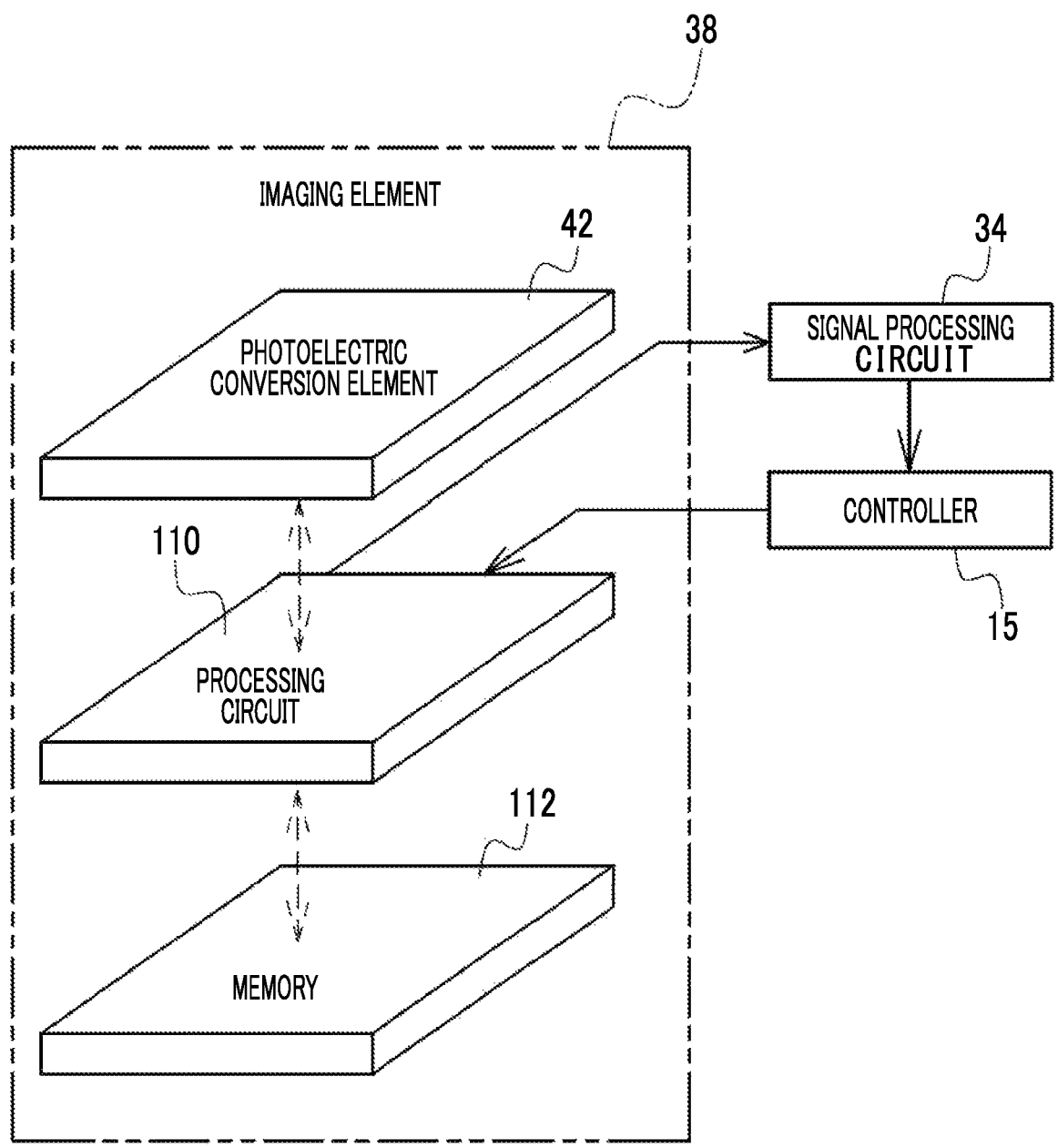
FIG. 6 is a conceptual diagram illustrating an example of a laminated structure of the imaging element according to the embodiment.

As illustrated in FIG. 6 as an example, the imaging element 38 incorporates the photoelectric conversion element 42, the processing circuit 110, and a memory 112. The imaging element 38 is an imaging element in which the photoelectric conversion element 42, the processing circuit 110, and the memory 112 are formed in one chip. That is, the photoelectric conversion element 42, the processing circuit 110, and the memory 112 are formed in one package. In the imaging element 38, the photoelectric conversion element 42 is laminated with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity.

For example, the processing circuit 110 is an LSI. The memory 112 is a memory of which a writing timing and a reading timing are different. Here, a DRAM is employed as an example of the memory 112.

The processing circuit 110 is a device including an ASIC and an FPGA and controls the entire imaging element 38 in accordance with an instruction of the controller 15. While an example of implementing the processing circuit 110 by the device including the ASIC and the FPGA is exemplified here, the technology of the present disclosure is not limited thereto. For example, a device including an ASIC, an FPGA, and/or a PLD may be used. In addition, a computer including a CPU, a storage such as an EEPROM that is a non-volatile storage device, and a memory such as a RAM that is a volatile storage device may be employed as the processing circuit 110. The number of CPUs included in the computer may be singular or plural. A GPU may be used instead of the CPU. In addition, the processing circuit 110 may be implemented by a combination of a hardware configuration and a software configuration.

The photoelectric conversion element 42 includes a plurality of photodiodes arranged in a matrix form. Photodiodes of "4896×3265" pixels are exemplified as an example of the plurality of photodiodes.

Color filters are arranged in each photodiode included in the photoelectric conversion element 42. The color filters include a G filter corresponding to green (G) that most contributes to obtaining a brightness signal, an R filter corresponding to red (R), and a B filter corresponding to blue (B).

The photoelectric conversion element 42 includes R pixels, G pixels, and B pixels. The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or honeycomb arrangement.

The imaging element 38 has a so-called electronic shutter function and controls an electric charge accumulation time period of each photodiode in the photoelectric conversion element 42 by performing the electronic shutter function under control of the controller 15. The electric charge accumulation time period refers to a so-called shutter speed.

In the imaging element 38, imaging for the still picture image and imaging for the live view image are selectively performed using a rolling shutter method. The imaging for the still picture image is implemented by performing the electronic shutter function and operating the mechanical shutter (not illustrated). The imaging for the live view image is implemented by performing the electronic shutter function without operating the mechanical shutter. While the rolling shutter method is illustrated here, the technology of the present disclosure is not limited thereto. A global shutter method may be applied instead of the rolling shutter method.

The memory 112 is an example of a "storage portion (memory)" according to the embodiment of the technology of the present disclosure. In the present embodiment, while the DRAM is employed as the memory 112, the technology of the present disclosure is also established in a case where the memory 112 is a memory of other types. In addition, the imaging element 38 is an example of a "laminated imaging element" according to the embodiment of the technology of the present disclosure.

Figure 7:
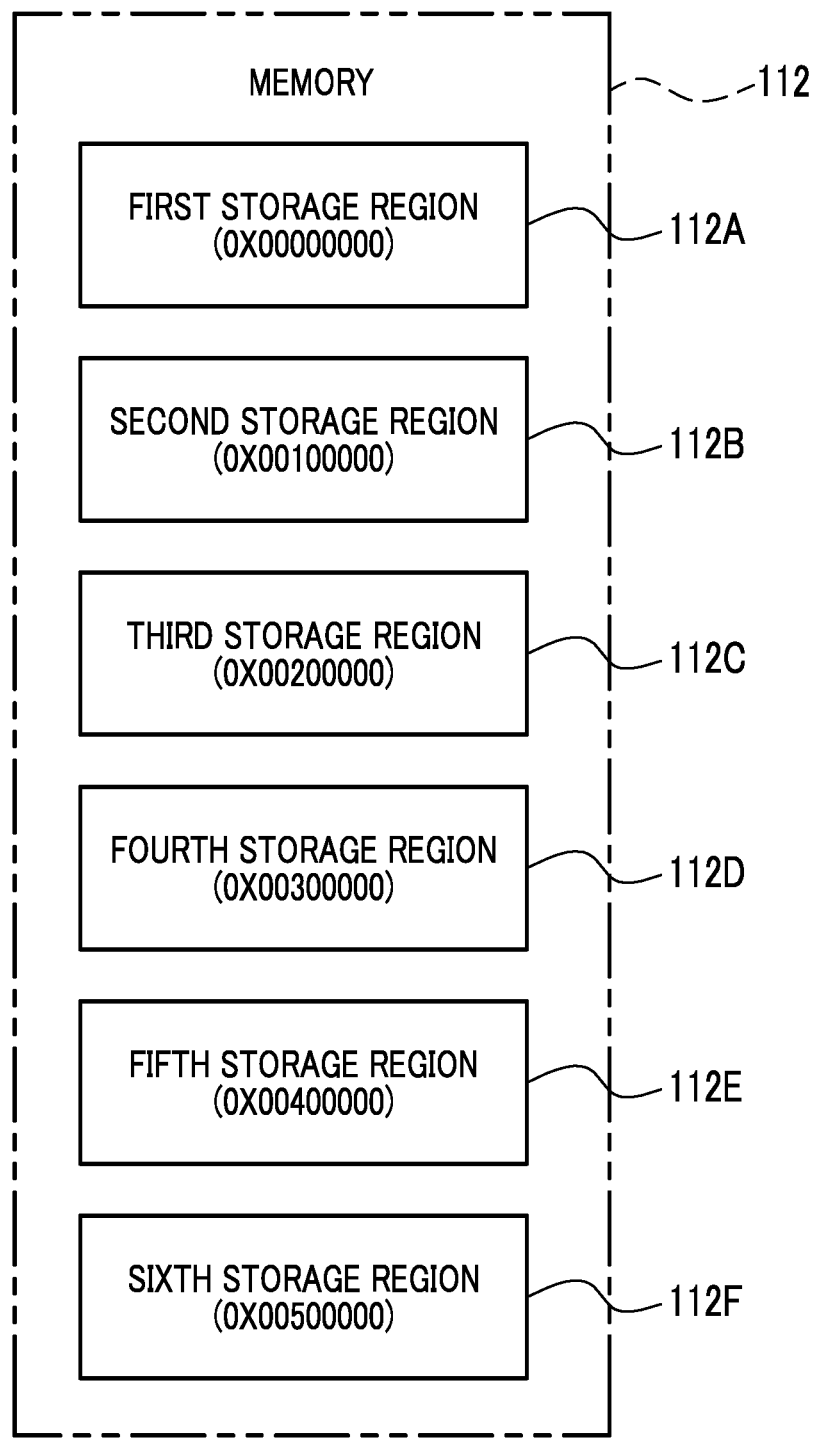
FIG. 7 is a block diagram illustrating an example of a structure of a memory included in the imaging element according to the embodiment.

As illustrated in FIG. 7 as an example, the memory 112 has a first storage region 112A, a second storage region 112B, a third storage region 112C, a fourth storage region 112D, a fifth storage region 112E, and a sixth storage region 112F. While six storage regions are illustrated here for convenience of description, the six storage regions are merely an example. The memory 112 may have a plurality of storage regions capable of storing the image data of a plurality of frames.

In the example illustrated in FIG. 7, an address in the memory 112 is assigned to each of the first storage region 112A, the second storage region 112B, the third storage region 112C, the fourth storage region 112D, the fifth storage region 112E, and the sixth storage region 112F. An address "0X00000000" is assigned to the first storage region 112A. An address "0X00100000" is assigned to the second storage region 112B. An address "0X00200000" is assigned to the third storage region 112C. An address "0X00300000" is assigned to the fourth storage region 112D. An address "0X00400000" is assigned to the fifth storage region 112E. An address "0X00500000" is assigned to the sixth storage region 112F.

Figure 8:
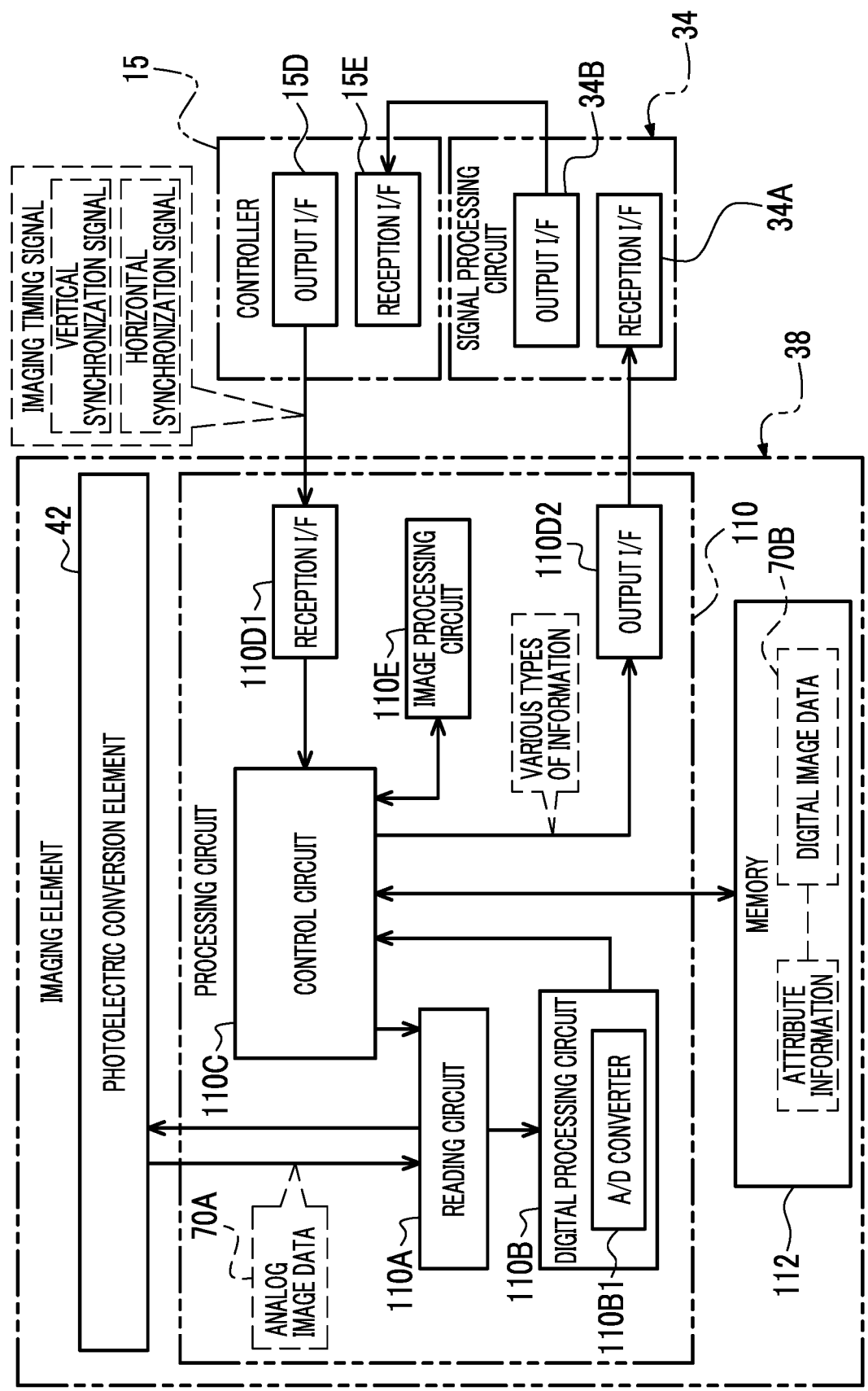
FIG. 8 is a block diagram illustrating an example of a hardware configuration of an electric system of the imaging element included in the imaging apparatus according to the embodiment, and is a block diagram for describing an example of a form of performing imaging using the imaging element and outputting attribute information from the imaging element.

As illustrated in FIG. 8 as an example, the processing circuit 110 comprises a reception I/F 110D1 and an output I/F 110D2. Here, the reception I/F 110D1 is an example of a "reception portion" and a "receiving portion" according to the embodiment of the technology of the present disclosure. The output I/F 110D2 is an example of an "output portion (output interface)" according to the embodiment of the technology of the present disclosure. The reception portion means, for example, an acceptor. The receiving portion means, for example, a receiver.

The output I/F 15D of the controller 15 is connected to the reception I/F 110D1 of the processing circuit 110 and outputs the imaging timing signal to the reception I/F 110D1. The reception I/F 110D1 receives the imaging timing signal output from the output I/F 15D.

The signal processing circuit 34 comprises a reception I/F 34A and an output I/F 34B. The reception I/F 34A is connected to the output I/F 110D2 of the imaging element 38. The output I/F 110D2 of the processing circuit 110 outputs various types of information such as the image data (hereinafter, simply referred to as the "various types of information") to the reception I/F 34A of the signal processing circuit 34. The reception I/F 34A receives the various types of information output from the output I/F 110D2. The signal processing circuit 34 performs signal processing as necessary on the various types of information received by the reception I/F 34A. The output I/F 34B is connected to the reception I/F 15E of the controller 15 and outputs the various types of information to the reception I/F 15E of the controller 15. The reception I/F 15E receives the various types of information output from the output I/F 34B.

In the imaging element 38, the processing circuit 110 comprises, in addition to the reception I/F 110D1 and the output I/F 110D2, a reading circuit 110A, a digital processing circuit 110B, a control circuit 110C, and an image processing circuit 110E. The control circuit 110C is an example of a "control portion (control circuit)" according to the embodiment of the technology of the present disclosure.

The reading circuit 110A is connected to each of the photoelectric conversion element 42, the digital processing circuit 110B, and the control circuit 110C. The digital processing circuit 110B is connected to the control circuit 110C. The control circuit 110C is connected to each of the memory 112, the reception I/F 110D1, the output I/F 110D2, and the image processing circuit 110E.

As illustrated in FIG. 8 as an example, the image data is broadly divided into analog image data 70A and digital image data 70B. Hereinafter, for convenience of description, the analog image data 70A and the digital image data 70B will be referred to as the "image data" without the reference signs unless otherwise necessary to distinguish therebetween.

Each of the reception I/F 110D1 and the output I/F 110D2 of the processing circuit 110 is a communication device including an FPGA. In addition, each of the output I/F 15D and the reception I/F 15E of the controller 15 is a communication device including an FPGA. Furthermore, each of the reception I/F 34A and the output I/F 34B of the signal processing circuit 34 is a communication device including an FPGA.

The reception I/F 110D1 of the processing circuit 110 and the output I/F 15D of the controller 15 are connected in accordance with a PCI-e connection standard. In addition, the output I/F 110D2 of the processing circuit 110 and the reception I/F 34A of the signal processing circuit 34 are connected in accordance with the PCI-e connection standard. Furthermore, the output I/F 34B of the signal processing circuit 34 and the reception I/F 15E of the controller 15 are connected in accordance with the PCI-e connection standard. Hereinafter, the reception I/F 110D1, the output I/F 110D2, the reception I/F 34A, the output I/F 34B, the reception I/F 15E, and the output I/F 15D will be referred to as a "communication I/F" without the reference signs unless otherwise necessary to distinguish therebetween.

Here, a communication device configured with a circuit (an ASIC, an FPGA, and/or a PLD or the like) is employed as the communication I/F. However, the communication device is merely an example. The communication I/F may be a computer including a CPU, a storage such as an EEPROM, and a memory such as a RAM. In this case, the number of CPUs included in the computer may be singular or plural. A GPU may be used instead of the CPU. In addition, the communication I/F may be implemented by a combination of a hardware configuration and a software configuration.

The reception I/F 110D1 receives the imaging timing signal output from the output I/F 15D of the controller 15 and transfers the received imaging timing signal to the control circuit 110C.

The reading circuit 110A controls the photoelectric conversion element 42 and reads out the analog image data 70A from the photoelectric conversion element 42 under control of the control circuit 110C. Reading of the analog image data 70A from the photoelectric conversion element 42 is performed in accordance with the imaging timing signal which is input into the processing circuit 110 from the controller 15.

Specifically, first, the reception I/F 110D1 receives the imaging timing signal from the controller 15 and transfers the received imaging timing signal to the control circuit 110C. Next, the control circuit 110C transfers the imaging timing signal transferred from the reception I/F 110D1 to the reading circuit 110A. That is, the vertical synchronization signal and the horizontal synchronization signal are transferred to the reading circuit 110A. The reading circuit 110A starts reading out the analog image data 70A in units of frames from the photoelectric conversion element 42 in accordance with the vertical synchronization signal transferred from the control circuit 110C. In addition, the reading circuit 110A starts reading out the analog image data 70A in units of horizontal lines in accordance with the horizontal synchronization signal transferred from the control circuit 110C.

The reading circuit 110A performs analog signal processing on the analog image data 70A read out from the photoelectric conversion element 42. The analog signal processing includes well-known processing such as noise cancelation processing and analog gain processing. The noise cancelation processing is processing of canceling a noise caused by variations in characteristics between pixels included in the photoelectric conversion element 42. The analog gain processing is processing of applying a gain to the analog image data 70A. In addition, the reading circuit 110A performs correlative double sampling on the analog image data 70A. After the correlative double sampling is performed on the analog image data 70A by the reading circuit 110A, the analog image data 70A is output to the digital processing circuit 110B.

The digital processing circuit 110B comprises an A/D converter 110B1. The A/D converter 110B1 performs A/D conversion on the analog image data 70A.

The digital processing circuit 110B performs digital signal processing on the analog image data 70A input from the reading circuit 110A. For example, the digital signal processing includes the correlative double sampling, the A/D conversion performed by the A/D converter 110B1, and digital gain processing.

The A/D converter 110B1 performs the A/D conversion on the analog image data 70A input from the reading circuit 110A. Accordingly, the analog image data 70A is digitized, and the digital image data 70B is obtained as RAW data. The digital gain processing is performed on the digital image data 70B by the digital processing circuit 110B. The digital gain processing refers to processing of applying a gain to the digital image data 70B. The digital image data 70B obtained by performing the digital signal processing in such a manner is output to the control circuit 110C by the digital processing circuit 110B.

The control circuit 110C outputs the digital image data 70B input from the digital processing circuit 110B to the image processing circuit 110E. The image processing circuit 110E performs image processing on the digital image data 70B input from the control circuit 110C and outputs the digital image data 70B after the image processing to the control circuit 110C. For example, demosaicing and/or digital thinning processing is exemplified as the "image processing" here.

The demosaicing is processing of calculating every color information for each pixel from a mosaic image corresponding to arrangement of the color filters. For example, in a case where the imaging element 38 is an imaging element to which color filters of three colors of R, G, and B are applied, color information on all of R, G, and B is calculated from a mosaic image of R, G, and B for each pixel. The digital thinning processing is processing of thinning out the pixels included in the image data in units of lines. For example, the units of lines refer to units of horizontal lines and/or units of vertical lines.

The memory 112 is a memory that can store the digital image data of a plurality of frames. The memory 112 has the storage regions (refer to FIG. 7) in units of pixels. The digital image data 70B is stored in a corresponding storage region of the memory 112 in units of pixels by the control circuit 110C. The control circuit 110C stores the digital image data 70B input from the image processing circuit 110E in the memory 112.

The control circuit 110C can randomly access the memory 112. The control circuit 110C acquires attribute information of the digital image data 70B stored in the memory 112 in accordance with the instruction from the controller 15. The attribute information is information indicating an attribute of the digital image data 70B stored in the memory 112. For example, the attribute information here refers to information including an address, an image size, an imaging time point, an exposure time period, imaging element sensitivity, and a deletion flag.

The address refers to information (recording address) for specifying a storage location of the digital image data 70B in units of frames in the memory 112. The image size refers to a size (horizontal size) of the digital image data 70B of one frame in a horizontal line direction and a size (vertical size) of the digital image data 70B of one frame in a vertical line direction. The imaging time point refers to a time point (for example, a year, a month, a date, hours, minutes, and seconds) at which imaging is performed by the imaging element 38. For example, the "time point at which imaging is performed" here refers to a time point as a point in time when the digital image data 70B of one frame is stored in the memory 112. However, the time point is merely an example. The time point at which imaging is performed may be a time point at which exposure of one frame is completed, a time point at which the A/D conversion of one frame is completed, or the like.

The exposure time period refers to a time period of the exposure required for obtaining the digital image data 70B of one frame. The imaging element sensitivity refers to, for example, sensitivity (sensor gain) of the photoelectric conversion element 42. The deletion flag refers to a flag indicating whether or not the digital image data 70B is deleted from the memory 112 along with subsequent imaging. In a case where the deletion flag is OFF, the digital image data 70B is not deleted from the memory 112 along with the subsequent imaging. In a case where the deletion flag is ON, the digital image data 70B is deleted from the memory 112 along with the subsequent imaging. The digital image data 70B of one frame deleted from the memory 112 is exemplified as an example of the digital image data 70B deleted from the memory 112.

The exposure time period and the imaging element sensitivity are an example of an "imaging condition" according to the embodiment of the technology of the present disclosure. The deletion flag in an ON state is an example of "deletion information" according to the embodiment of the technology of the present disclosure.

Here, while the exposure time period and the imaging element sensitivity are exemplified as an example of the "imaging condition" according to the embodiment of the technology of the present disclosure, the technology of the present disclosure is not limited thereto. Instead of the exposure time period and/or the imaging element sensitivity, or in addition to the exposure time period and/or the imaging element sensitivity, a type of imaging lens 40, a subject distance, a focal length, an angle of view, and/or whether or not shake correction is performed, or the like may be employed.

The control circuit 110C generates the attribute information and outputs the generated attribute information to the output I/F 110D2 in accordance with an instruction related to the attribute information from the controller 15. For example, the instruction related to the attribute information refers to an instruction to request the processing circuit 110 to output the attribute information by the controller 15. In the present embodiment, the vertical synchronization signal is employed as an example of the instruction related to the attribute information. The output I/F 110D2 outputs the attribute information input from the control circuit 110C to the signal processing circuit 34.

Specifically, first, the reception I/F 110D1 receives the vertical synchronization signal as the instruction related to the attribute information from the controller 15. Next, the control circuit 110C generates the attribute information related to the oldest stored digital image data 70B among pieces of the digital image data 70B stored in the memory 112 as the attribute information corresponding to the vertical synchronization signal received by the reception I/F 110D1. The output I/F 110D2 outputs the attribute information generated by the control circuit 110C to the signal processing circuit 34.

Figure 9:
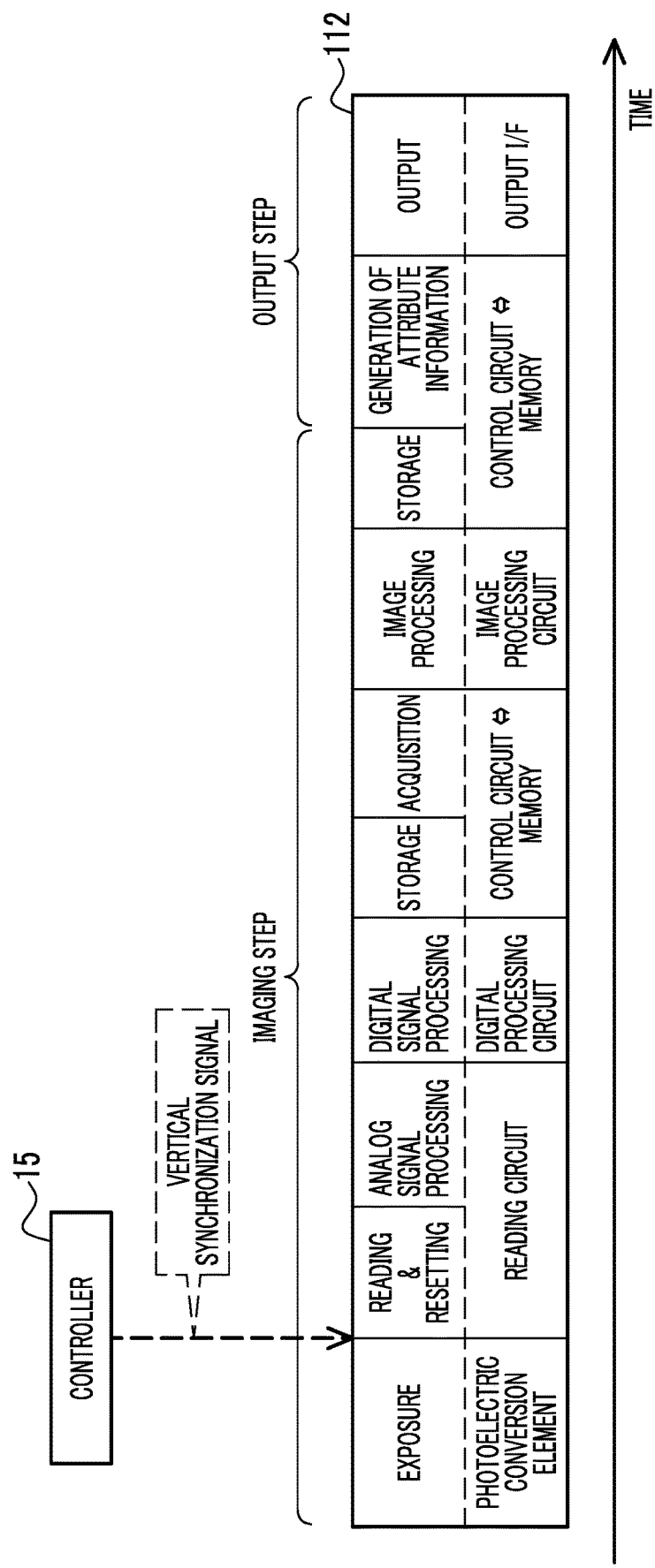
FIG. 9 is a conceptual diagram illustrating an example of contents of an imaging step and an output step performed by the imaging element according to the embodiment.

As illustrated in FIG. 9 as an example, a step performed by the imaging element 38 includes an imaging step and an output step.

In the imaging step, exposure, reading of the analog image data 70A, resetting of the photoelectric conversion element 42, the analog signal processing, the digital signal processing, first-time storage, acquisition of the digital image data 70B, the image processing, and second-time storage are performed in this order.

The exposure is performed by the photoelectric conversion element 42. Reading of the analog image data 70A, resetting of the photoelectric conversion element 42, and the analog signal processing are performed by the reading circuit 110A. Reading of the analog image data 70A is started on a condition that the vertical synchronization signal is received by the reception I/F 110D1. A period in which the exposure is performed by the photoelectric conversion element 42 is a period in which reading of the analog image data 70A and resetting of the photoelectric conversion element 42 are not performed. Resetting of the photoelectric conversion element 42 refers to an operation of deleting residual electric charges of each pixel in the photoelectric conversion element 42. The exposure performed by the photoelectric conversion element 42 is performed after previous resetting of the photoelectric conversion element 42 by the reading circuit 110A and before reading.

The digital signal processing is performed by the digital processing circuit 110B. The first-time storage refers to storage of the digital image data 70B obtained by performing the digital signal processing in the memory 112. Acquisition of the digital image data 70B refers to acquisition of the digital image data 70B from the memory 112. The first-time storage and acquisition of the digital image data 70B are performed by the control circuit 110C. The image processing circuit 110E performs the image processing on the digital image data 70B acquired by the control circuit 110C. The second-time storage refers to storage, in the memory 112, of the digital image data 70B on which the image processing is performed. The second-time storage is performed by the control circuit 110C.

In the output step, generation of the attribute information and output of the attribute information are performed. Generation of the attribute information refers to generation of the attribute information for each frame related to the digital image data 70B stored in the memory 112. Generation of the attribute information is performed by the control circuit 110C. Output of the attribute information refers to output, by the output I/F 110D2, of the attribute information generated by the control circuit 110C.

Figure 10:
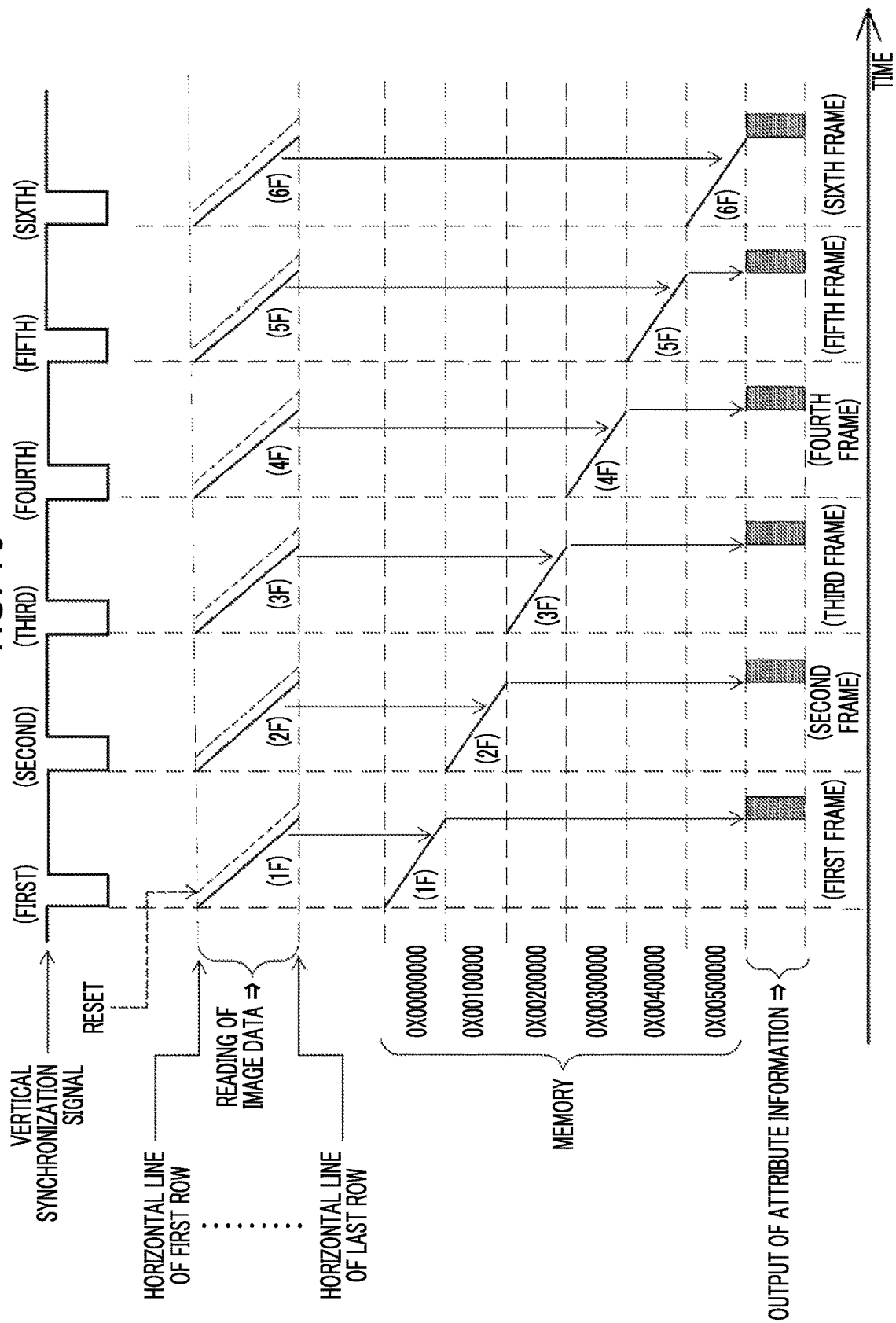
FIG. 10 is a time chart illustrating an example of a processing content in the imaging element included in the imaging apparatus according to the embodiment.

In FIG. 10, a flow from reading of the image data of a first frame (1F) to a sixth frame (6F) until storage of the image data in the memory 112 and an example of an output timing of the attribute information for each frame are illustrated. Here, "F" of 1F to 6F illustrated in FIG. 10 is the abbreviation of "Frame". In the example illustrated in FIG. 10, for convenience of description, an aspect in which the digital image data 70B of one frame is stored in each of the first storage region 112A, the second storage region 112B, the third storage region 112C, the fourth storage region 112D, the fifth storage region 112E, and the sixth storage region 112F of the memory 112 is illustrated.

As illustrated in FIG. 10 as an example, each time the vertical synchronization signal is received by the reception I/F 110D1, reading of the analog image data 70A of one frame from the photoelectric conversion element 42 is started. In the example illustrated in FIG. 10, first to sixth vertical synchronization signals are sequentially received by the reception I/F 110D1, and reading of the analog image data 70A of the first frame to the sixth frame is started.

Reading of the analog image data 70A is performed for each line from a horizontal line of a first row to a horizontal line of a last row of the photoelectric conversion element 42 in accordance with the horizontal synchronization signal. In a case where reading is finished for each line, each pixel of a horizontal line in which reading is finished is reset. The analog image data 70A is converted into the digital image data 70B, and the digital image data 70B is stored in the memory 112 in units of frames in a distinguishable manner in order of frames (imaging order) of the read analog image data 70A using a FIFO method. Specifically, the most recent digital image data 70B is sequentially overwritten and stored in units of frames in the first storage region 112A, the second storage region 112B, the third storage region 112C, the fourth storage region 112D, the fifth storage region 112E, and the sixth storage region 112F. Overwriting storage is repeated in an order of the first storage region 112A, the second storage region 112B, the third storage region 112C, the fourth storage region 112D, the fifth storage region 112E, and the sixth storage region 112F.

The output I/F 110D2 outputs the attribute information related to the most recent digital image data 70B among the pieces of digital image data 70B stored in the memory 112 to the signal processing circuit 34. In this case, first, each time storage of the most recent digital image data 70B of one frame in the memory 112 at a timing of reception of the vertical synchronization signal by the reception I/F 110D1 is completed, the control circuit 110C generates the attribute information related to the most recent digital image data 70B among the pieces of digital image data 70B stored in the memory 112. The output I/F 110D2 outputs the attribute information generated by the control circuit 110C to the signal processing circuit 34.

Figure 11B:
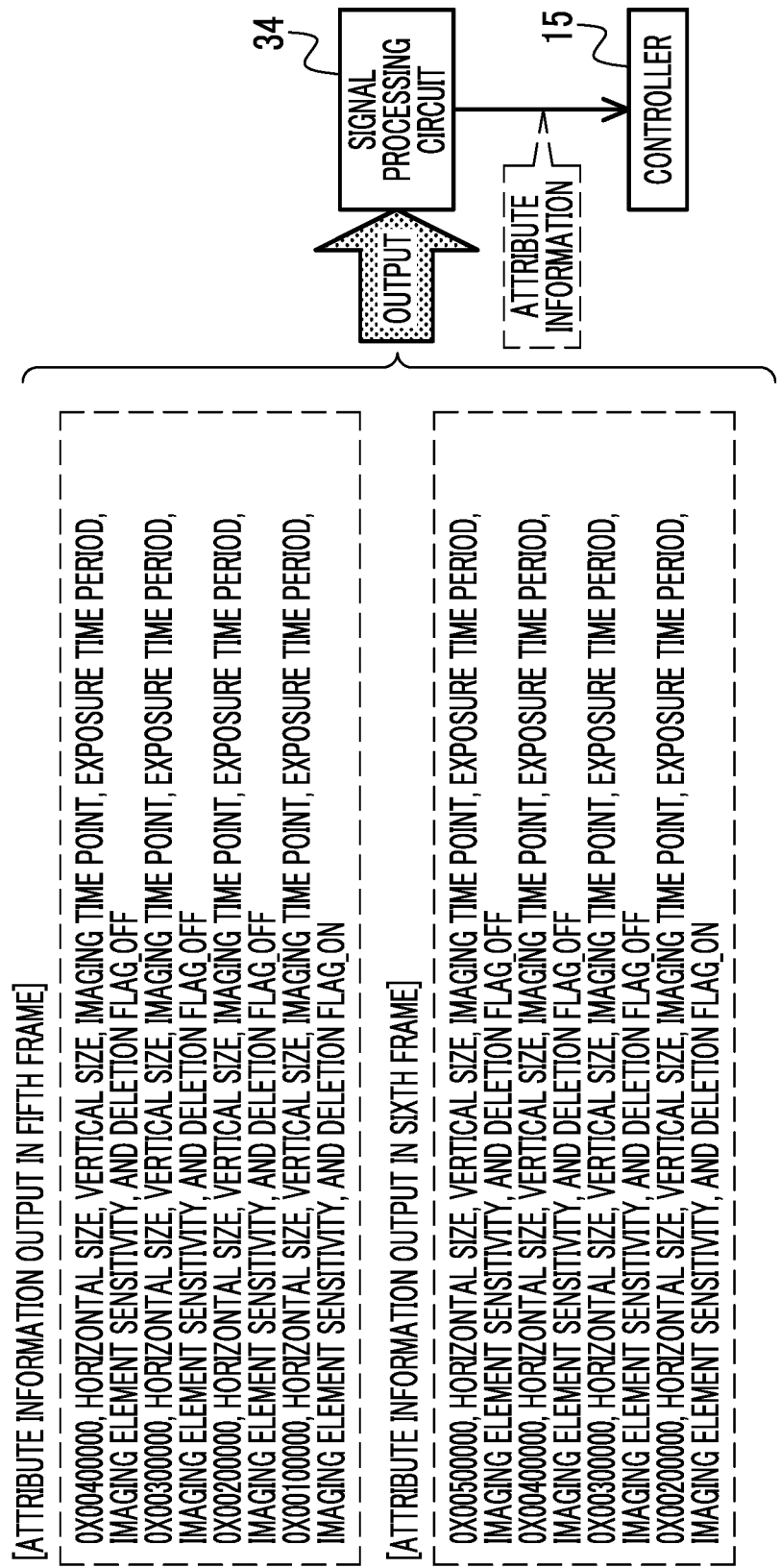
FIG. 11B is a conceptual diagram illustrating an example of the content of the attribute information output from the output I/F of the imaging element in a fifth frame and a sixth frame.

As illustrated in FIG. 11A and FIG. 11B as an example, the attribute information of each frame (in the examples illustrated in FIG. 11A and FIG. 11B, the first frame to the sixth frame) is output to the signal processing circuit 34 by the output I/F 110D2. The signal processing circuit 34 outputs the input attribute information to the controller 15.

As illustrated in FIG. 11A as an example, the attribute information output in the first frame is the attribute information related to the digital image data 70B stored in the first storage region 112A. In the example illustrated in FIG. 11A, information including the address of the first storage region 112A, the horizontal size of the digital image data 70B in the first storage region 112A, the vertical size of the digital image data 70B in the first storage region 112A, the imaging time point related to the digital image data 70B in the first storage region 112A, the exposure time period related to the digital image data 70B in the first storage region 112A, the imaging element sensitivity related to the digital image data 70B in the first storage region 112A, and deletion flag_OFF are exemplified as an example of the attribute information related to the digital image data 70B stored in the first storage region 112A. The "deletion flag_OFF" here refers to information indicating an OFF state of the deletion flag.

The attribute information output in the second frame is the attribute information related to the digital image data 70B stored in the first storage region 112A and the attribute information related to the digital image data 70B stored in the second storage region 112B. In the example illustrated in FIG. 11A, information including the address of the second storage region 112B, the horizontal size of the digital image data 70B in the second storage region 112B, the vertical size of the digital image data 70B in the second storage region 112B, the imaging time point related to the digital image data 70B in the second storage region 112B, the exposure time period related to the digital image data 70B in the second storage region 112B, the imaging element sensitivity related to the digital image data 70B in the second storage region 112B, and the deletion flag_OFF are exemplified as an example of the attribute information related to the digital image data 70B stored in the second storage region 112B.

The attribute information output in the third frame is the attribute information related to the digital image data 70B stored in the first storage region 112A, the attribute information related to the digital image data 70B stored in the second storage region 112B, and the attribute information related to the digital image data 70B stored in the third storage region 112C. In the example illustrated in FIG. 11A, information including the address of the third storage region 112C, the horizontal size of the digital image data 70B in the third storage region 112C, the vertical size of the digital image data 70B in the third storage region 112C, the imaging time point related to the digital image data 70B in the third storage region 112C, the exposure time period related to the digital image data 70B in the third storage region 112C, the imaging element sensitivity related to the digital image data 70B in the third storage region 112C, and the deletion flag_OFF are exemplified as an example of the attribute information related to the digital image data 70B stored in the third storage region 112C.

The attribute information output in the third frame is the attribute information related to the digital image data 70B stored in the first storage region 112A, the attribute information related to the digital image data 70B stored in the second storage region 112B, the attribute information related to the digital image data 70B stored in the third storage region 112C, and the attribute information related to the digital image data 70B stored in the fourth storage region 112D. In the example illustrated in FIG. 11A, information including the address of the fourth storage region 112D, the horizontal size of the digital image data 70B in the fourth storage region 112D, the vertical size of the digital image data 70B in the fourth storage region 112D, the imaging time point related to the digital image data 70B in the fourth storage region 112D, the exposure time period related to the digital image data 70B in the fourth storage region 112D, the imaging element sensitivity related to the digital image data 70B in the fourth storage region 112D, and the deletion flag_OFF are exemplified as an example of the attribute information related to the digital image data 70B stored in the fourth storage region 112D. Here, the "deletion flag_OFF" included in the attribute information that is output in the fourth frame and is related to the digital image data 70B stored in the first storage region 112A is changed to "deletion flag_ON" by the control circuit 110C. The "deletion flag_ON" refers to information indicating an ON state of the deletion flag.

In such a manner, the "deletion flag_OFF" in the attribute information related to the digital image data 70B stored in the first storage region 112A is changed to the "deletion flag_ON" by the control circuit 110C. This means that the attribute information output in the fourth frame from the output I/F 110D2 is information including information indicating that the digital image data 70B in the first storage region 112A is deleted from the memory 112 along with the subsequent imaging.

In a case where the "deletion flag_ON" is included in the attribute information output in the fourth frame, the attribute information related to deletion target image data that is the digital image data 70B of a deletion target in the memory 112, that is, the attribute information related to the first storage region 112A, is deleted by the control circuit 110C along with the subsequent imaging (for example, at a point in time of a start of imaging of the fifth frame, or from the current point in time until the start of imaging of the fifth frame). In addition, the digital image data 70B is deleted from the first storage region 112A by the control circuit 110C. In this case, for example, along with the subsequent imaging, first, the attribute information related to the first storage region 112A is deleted by the control circuit 110C. Next, the digital image data 70B is deleted from the first storage region 112A by the control circuit 110C. Here, an example of a form of deleting the digital image data 70B and the attribute information is exemplified here. However, the technology of the present disclosure is not limited thereto, and "deletion" includes not only actual deletion of the digital image data 70B and the attribute information but also processing of freeing the region to be overwritable.

As illustrated in FIG. 11B as an example, the attribute information output in the fifth frame is the attribute information related to the digital image data 70B stored in the second storage region 112B, the attribute information related to the digital image data 70B stored in the third storage region 112C, the attribute information related to the digital image data 70B stored in the fourth storage region 112D, and the attribute information related to the digital image data 70B stored in the fifth storage region 112E. In the example illustrated in FIG. 11B, information including the address of the fifth storage region 112E, the horizontal size of the digital image data 70B in the fifth storage region 112E, the vertical size of the digital image data 70B in the fifth storage region 112E, the imaging time point related to the digital image data 70B in the fifth storage region 112E, the exposure time period related to the digital image data 70B in the fifth storage region 112E, the imaging element sensitivity related to the digital image data 70B in the fifth storage region 112E, and the deletion flag_OFF are exemplified as an example of the attribute information related to the digital image data 70B stored in the fifth storage region 112E. Here, the "deletion flag_OFF" included in the attribute information that is output in the fifth frame and is related to the digital image data 70B stored in the second storage region 112B is changed to the "deletion flag_ON" by the control circuit 110C.

In such a manner, in a case where the "deletion flag_OFF" in the attribute information related to the digital image data 70B stored in the second storage region 112B is changed to the "deletion flag_ON" by the control circuit 110C, the attribute information related to the deletion target image data that is the digital image data 70B of the deletion target in the memory 112, that is, the attribute information related to the second storage region 112B, is deleted by the control circuit 110C along with the subsequent imaging (for example, at a point in time of a start of imaging of the sixth frame, or from the current point in time until the start of imaging of the sixth frame). In addition, the digital image data 70B is deleted from the second storage region 112B by the control circuit 110C. In this case, for example, along with the subsequent imaging, first, the attribute information related to the second storage region 112B is deleted by the control circuit 110C. Next, the digital image data 70B is deleted from the second storage region 112B by the control circuit 110C.

The attribute information output in the sixth frame is the attribute information related to the digital image data 70B stored in the third storage region 112C, the attribute information related to the digital image data 70B stored in the fourth storage region 112D, the attribute information related to the digital image data 70B stored in the fifth storage region 112E, and the attribute information related to the digital image data 70B stored in the sixth storage region 112F. In the example illustrated in FIG. 11B, information including the address of the sixth storage region 112F, the horizontal size of the digital image data 70B in the sixth storage region 112F, the vertical size of the digital image data 70B in the sixth storage region 112F, the imaging time point related to the digital image data 70B in the sixth storage region 112F, the exposure time period related to the digital image data 70B in the sixth storage region 112F, the imaging element sensitivity related to the digital image data 70B in the sixth storage region 112F, and the deletion flag_OFF are exemplified as an example of the attribute information related to the digital image data 70B stored in the sixth storage region 112F. Here, the "deletion flag_OFF" included in the attribute information that is output in the sixth frame and is related to the digital image data 70B stored in the third storage region 112C is changed to the "deletion flag_ON" by the control circuit 110C.

In such a manner, in a case where the "deletion flag_OFF" in the attribute information related to the digital image data 70B stored in the third storage region 112C is changed to the "deletion flag_ON" by the control circuit 110C, the attribute information related to the deletion target image data that is the digital image data 70B of the deletion target in the memory 112, that is, the attribute information related to the third storage region 112C, is deleted by the control circuit 110C along with the subsequent imaging (for example, at a point in time of a start of imaging of a seventh frame, or from the current point in time until the start of imaging of the seventh frame). In addition, the digital image data 70B is deleted from the third storage region 112C by the control circuit 110C. In this case, for example, along with the subsequent imaging, first, the attribute information related to the third storage region 112C is deleted by the control circuit 110C. Next, the digital image data 70B is deleted from the third storage region 112C by the control circuit 110C.

In such a manner, in a case where the attribute information is transmitted to the signal processing circuit 34 for each frame by the output I/F 110D2, the signal processing circuit 34 transfers the attribute information to the controller 15. The attribute information transferred to the controller 15 from the signal processing circuit 34 is received by the reception I/F 15E of the controller 15. The controller 15 acquires the address from the attribute information received by the reception I/F 15E as necessary.

As illustrated in FIG. 12 as an example, the controller 15 outputs the address acquired from the attribute information to the reception I/F 110D1 of the imaging element 38 through the output I/F 15D. The reception I/F 110D1 of the imaging element 38 receives the address from the controller 15. The control circuit 110C acquires the digital image data 70B from the memory 112 in accordance with the address received by the reception I/F 110D1 and outputs the acquired digital image data 70B to the signal processing circuit 34 using the output I/F 110D2.

While an example of a form of outputting the address to the imaging element 38 from the output I/F 15D of the controller 15 is illustratively described here, the technology of the present disclosure is not limited thereto. For example, the controller 15 may further comprise a transmission I/F, and the address may be transmitted to the imaging element 38 from the transmission I/F.

In addition, while an example of a form of receiving the address using the reception I/F 110D1 is illustratively described here, the technology of the present disclosure is not limited thereto. For example, the imaging element 38 may further comprise a receiving I/F, and the address transmitted from the controller 15 may be received by the receiving I/F of the imaging element 38.

Next, an action of the imaging apparatus 10 will be described.

First, a flow of attribute information output processing executed by the processing circuit 110 of the imaging element 38 will be described with reference to FIG. 13.

Figure 13:
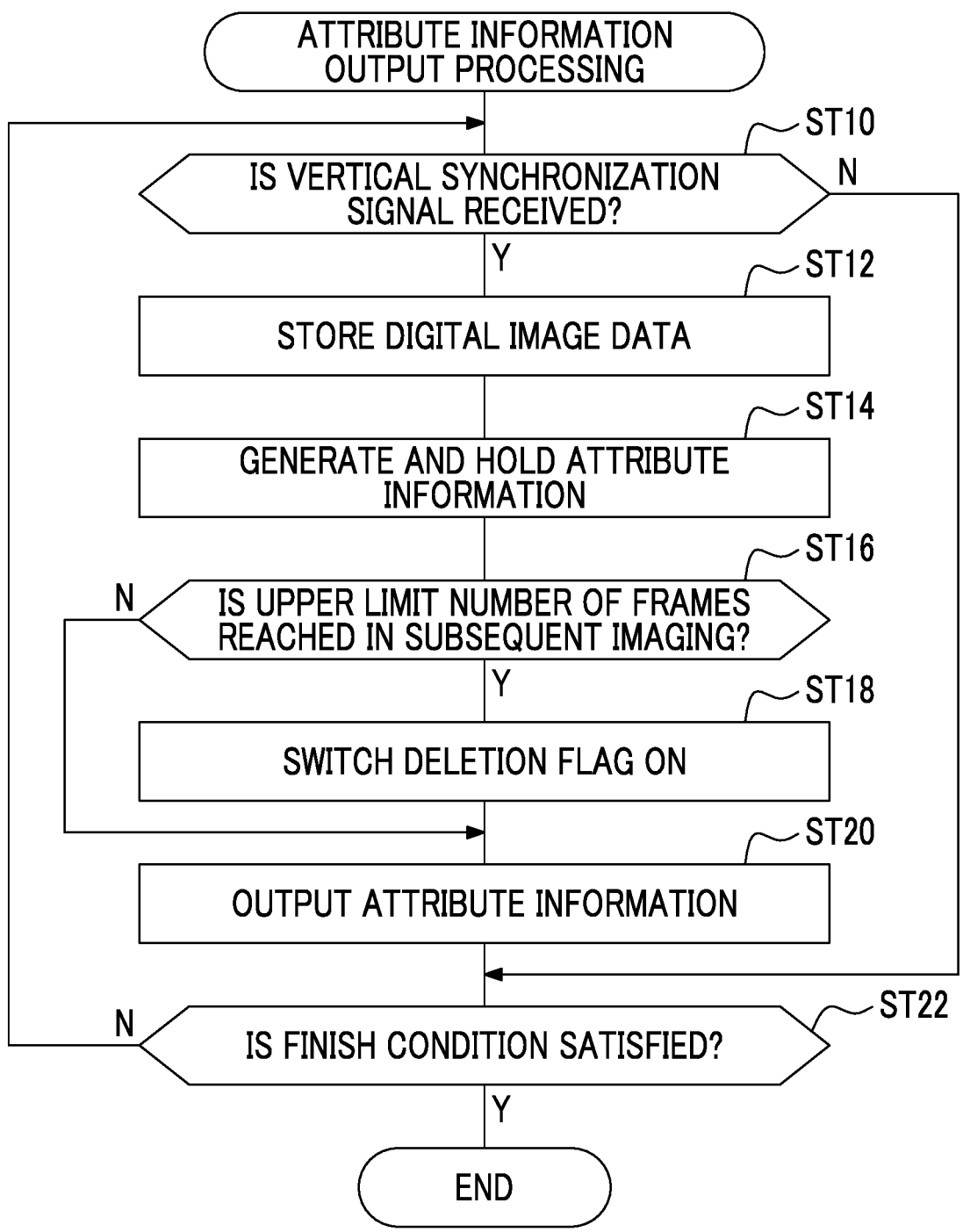
FIG. 13 is a flowchart illustrating an example of a flow of attribute information output processing according to the embodiment.

In the attribute information output processing illustrated in FIG. 13, first, in step ST10, the control circuit 110C determines whether or not the vertical synchronization signal is received by the reception I/F 110D1. In step ST10, in a case where the vertical synchronization signal is not received by the reception I/F 110D1, a negative determination is made, and the attribute information output processing transitions to step ST22. In step ST10, in a case where the vertical synchronization signal is received by the reception I/F 110D1, a positive determination is made, and the attribute information output processing transitions to step ST12.

In step ST12, the control circuit 110C stores the digital image data 70B obtained by imaging in the memory 112. Then, the attribute information output processing transitions to step ST14.

In step ST14, the control circuit 110C generates the attribute information related to the digital image data 70B stored in the memory 112 in step ST12 and holds the generated attribute information. Then, the attribute information output processing transitions to step ST16.

In step ST16, the control circuit 110C determines whether or not the number of frames that can store the digital image data 70B in the memory 112 by performing the subsequent imaging reaches an upper limit number. In the present embodiment, the memory 112 has six storage regions of the first storage region 112A, the second storage region 112B, the third storage region 112C, the fourth storage region 112D, the fifth storage region 112E, and the sixth storage region 112F. Thus, the "upper limit number" here is "6". The upper limit number is not limited thereto and may be the number of frames that can be stored in the memory 112.

In step ST16, in a case where the number of frames that can store the digital image data 70B in the memory 112 by performing the subsequent imaging does not reach the upper limit number, a negative determination is made, and the attribute information output processing transitions to step ST20. In step ST16, in a case where the number of frames that can store the digital image data 70B in the memory 112 by performing the subsequent imaging reaches the upper limit number, a positive determination is made, and the attribute information output processing transitions to step ST18.

In step ST18, the control circuit 110C switches ON the deletion flag included in the attribute information related to the oldest digital image data 70B of one frame stored in the memory 112 among the pieces of digital image data 70B of all frames stored in the memory 112. Then, the attribute information output processing transitions to step ST20.

In step ST20, the control circuit 110C outputs the attribute information held at the current point in time to the signal processing circuit 34 using the output I/F 110D2. Then, the attribute information output processing transitions to step ST22.

In step ST22, the control circuit 110C determines whether or not a condition (hereinafter, referred to as an "attribute information output processing finish condition") under which the attribute information output processing is finished is satisfied. A condition that an instruction to finish the attribute information output processing is received by the reception device 84 (refer to FIG. 4) is exemplified as an example of the attribute information output processing finish condition. In step ST22, in a case where the attribute information output processing finish condition is not satisfied, a negative determination is made, and the attribute information output processing transitions to step ST10. In step ST22, in a case where the attribute information output processing finish condition is satisfied, a positive determination is made, and the attribute information output processing is finished.

Next, a flow of data deletion processing executed by the processing circuit 110 of the imaging element 38 will be described with reference to FIG. 14.

Figure 14:
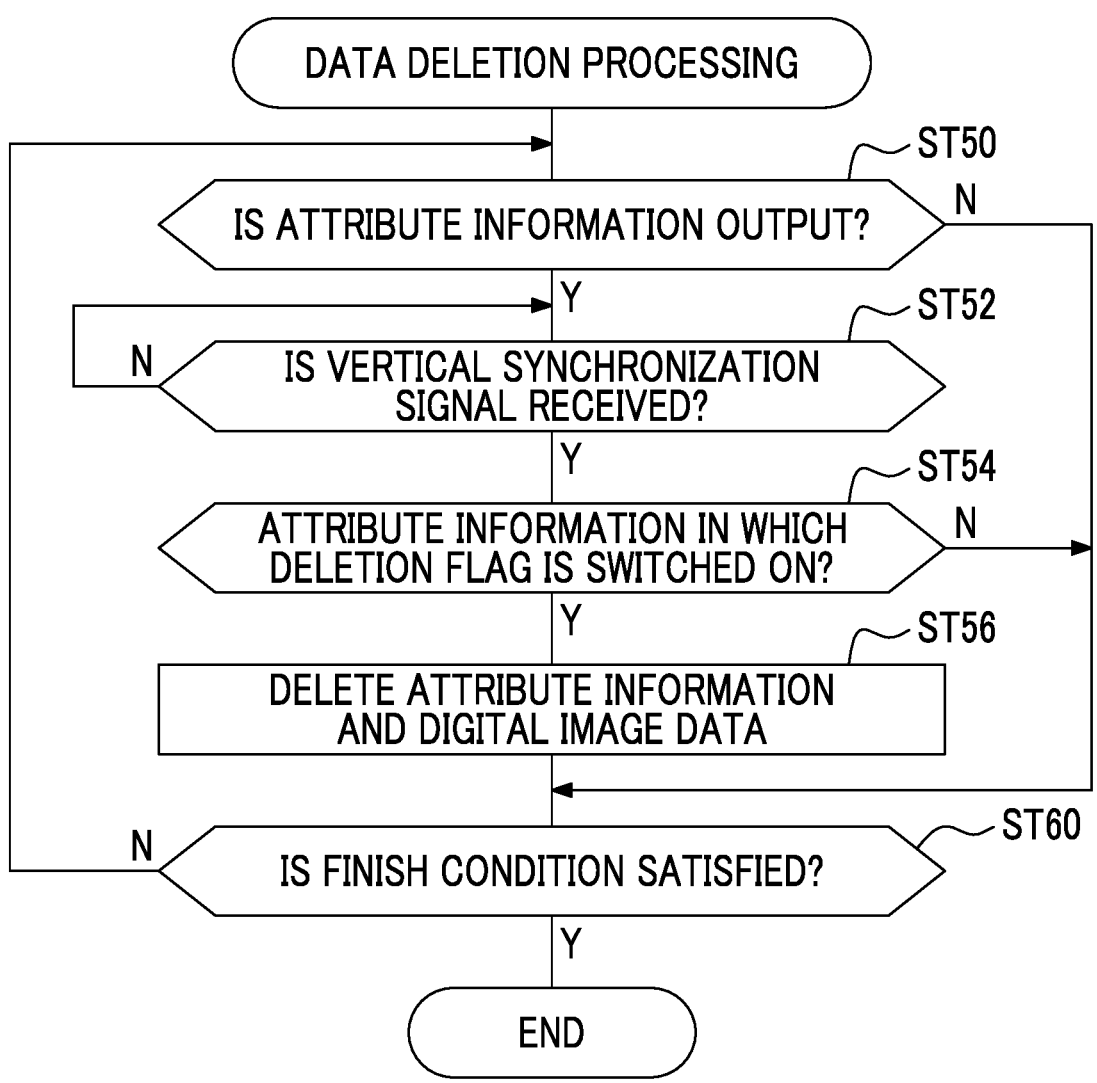
FIG. 14 is a flowchart illustrating an example of a flow of data deletion processing according to the embodiment.

In the data deletion processing illustrated in FIG. 14, first, in step ST50, the control circuit 110C determines whether or not the attribute information is output by the output I/F 110D2. In step ST50, in a case where the attribute information is not output by the output I/F 110D2, a negative determination is made, and the data deletion processing transitions to step ST60. In step ST50, in a case where the attribute information is output by the output I/F 110D2, a positive determination is made, and the data deletion processing transitions to step ST52.

In step ST52, the control circuit 110C determines whether or not the vertical synchronization signal is received by the reception I/F 110D1. In step ST52, in a case where the vertical synchronization signal is not received by the reception I/F 110D1, a negative determination is made, and the determination of step ST52 is performed again. In step ST52, in a case where the vertical synchronization signal is received by the reception I/F 110D1, a positive determination is made, and the data deletion processing transitions to step ST54.

In step ST54, the control circuit 110C determines whether or not the attribute information in which the deletion flag is switched ON is held. In step ST54, in a case where the attribute information in which the deletion flag is switched ON is not held, a negative determination is made, and the data deletion processing transitions to step ST60. In step ST54, in a case where the attribute information in which the deletion flag is switched ON is held, a positive determination is made, and the data deletion processing transitions to step ST56.

In step ST56, first, the control circuit 110C specifies the digital image data 70B from the address included in the attribute information in which the deletion flag is switched ON among all pieces of the attribute information held at the current point in time. Next, the control circuit 110C deletes the attribute information in which the deletion flag is switched ON among all pieces of the attribute information held at the current point in time. The control circuit 110C deletes, from the memory 112, the digital image data 70B specified from the address. Then, the data deletion processing transitions to step ST60.

In step ST60, the control circuit 110C determines whether or not a condition (hereinafter, referred to as a "data deletion processing finish condition") under which the data deletion processing is finished is satisfied. A condition that an instruction to finish the data deletion processing is received by the reception device 84 (refer to FIG. 4) is exemplified as the data deletion processing finish condition. In step ST60, in a case where the data deletion processing finish condition is not satisfied, a negative determination is made, and the data deletion processing transitions to step ST50. In step ST60, in a case where the data deletion processing finish condition is satisfied, a positive determination is made, and the data deletion processing is finished.

As described above, in the imaging apparatus 10, the instruction related to the attribute information is received by the reception I/F 110D1, and the attribute information corresponding to the received instruction is output to the rear stage circuit 13 by the output I/F 110D2. Accordingly, the rear stage circuit 13 can request the imaging element 38 to provide the digital image data 70B using the attribute information. Accordingly, the rear stage circuit 13 can selectively acquire necessary digital image data 70B from the imaging element 38. In addition, power consumption required for output by the imaging element 38 can be reduced, compared to a case where both of the digital image data 70B and at least a part included in the attribute information are output at the same time.

In addition, in the imaging apparatus 10, the attribute information corresponding to the vertical synchronization signal from the controller 15 is generated by the control circuit 110C, and the generated attribute information is output to the signal processing circuit 34 by the output I/F 110D2. Accordingly, the rear stage circuit 13 can acquire the attribute information from the imaging element 38 without newly generating and using a signal different from the vertical synchronization signal.

In addition, in the imaging apparatus 10, the attribute information related to the most recent digital image data 70B among all pieces of the digital image data 70B stored in the memory 112 is output by the output I/F 110D2. Accordingly, the rear stage circuit 13 can acquire the attribute information related to the most recent digital image data 70B.

In addition, in the imaging apparatus 10, the attribute information related to the most recent digital image data 70B at the timing of reception of the vertical synchronization signal by the reception I/F 110D1 is output by the output I/F 110D2. Accordingly, the rear stage circuit 13 can acquire the attribute information related to the most recent digital image data 70B at the timing of reception of the vertical synchronization signal by the reception I/F 110D1.

In addition, in the imaging apparatus 10, the output I/F 110D2 can output the attribute information of the digital image data 70B of each of a plurality of frames, and the attribute information is output in the imaging order by the output I/F 110D2. Accordingly, the rear stage circuit 13 can acquire the digital image data 70B from the imaging element 38 in the imaging order.

In addition, in the imaging apparatus 10, information including the address, the image size, the imaging time point, and the imaging condition is employed as the attribute information. Accordingly, a range of application of the digital image data 70B acquired from the imaging element 38 by the rear stage circuit 13 can be increased, compared to a case where any of the address, the image size, the imaging time point, and the imaging condition is not included in the attribute information.

In addition, in the imaging apparatus 10, in a case where the digital image data 70B is deleted from the memory 112 along with the subsequent imaging, the deletion flag that is a flag switched ON is included in the attribute information output from the output I/F 110D2. Accordingly, it is possible that an instruction to output the digital image data 70B not stored in the memory 112 is not issued by the rear stage circuit 13.

In addition, in the imaging apparatus 10, in a case where the digital image data 70B is deleted from the memory 112 along with the subsequent imaging, the attribute information in which the deletion flag is switched ON is deleted from the memory 112 by the control circuit 110C, and the digital image data 70B specified from the address included in the attribute information in which the deletion flag is switched ON is deleted from the memory 112 by the control circuit 110C. Accordingly, both of the attribute information and the digital image data 70B related to the attribute information can be deleted at different timings.

In addition, in the imaging apparatus 10, the attribute information transmitted from the controller 15 is received by the reception I/F 110D1. In the control circuit 110C, the digital image data 70B is acquired from the memory 112 in accordance with the attribute information received by the reception I/F 110D1, and the acquired digital image data 70B is output to the signal processing circuit 34 by the output I/F 110D2. Accordingly, the imaging element 38 can output the digital image data 70B requested by the rear stage circuit 13 to the rear stage circuit 13.

In addition, in the imaging apparatus 10, the imaging element in which the photoelectric conversion element 42, the processing circuit 110, and the memory 112 are formed in one chip is employed as the imaging element 38. Accordingly, portability of the imaging element 38 is increased, compared to an imaging element in which the photoelectric conversion element 42, the processing circuit 110, and the memory 112 are not formed in one chip. In addition, a degree of design freedom can be increased, compared to a case of the imaging element in which the photoelectric conversion element 42, the processing circuit 110, and the memory 112 are not formed in one chip. Furthermore, it is possible to contribute to size reduction of the imaging apparatus 10, compared to a case of the imaging element in which the photoelectric conversion element 42, the processing circuit 110, and the memory 112 are not formed in one chip.

In addition, as illustrated in FIG. 6, the laminated imaging element in which the photoelectric conversion element 42 is laminated with the memory 112 is employed as the imaging element 38. Accordingly, a transfer speed of the image data from the photoelectric conversion element 42 to the memory 112 can be increased, compared to a case of not laminating the photoelectric conversion element 42 and the memory 112. Improving the transfer speed contributes to high-speed processing in the entire processing circuit 110. In addition, the degree of design freedom can be increased, compared to a case of not laminating the photoelectric conversion element 42 and the memory 112. Furthermore, it is possible to contribute to size reduction of the imaging apparatus 10, compared to a case of not laminating the photoelectric conversion element 42 and the memory 112.

In addition, in the imaging apparatus 10, a live view image or the like based on the digital image data 70B output by the output I/F 110D2 is displayed on the display 26 by the CPU 15A. Accordingly, the live view image or the like based on the digital image data 70B output by the output I/F 110D2 can be visible to the user.

Furthermore, in the imaging apparatus 10, the digital image data 70B output by the output I/F 110D2 is stored in the storage 15B, the smart device, the personal computer, the server, the USB memory, and/or the memory card or the like by the CPU 15A. Accordingly, the digital image data 70B output by the output I/F 110D2 can be managed.

In the embodiment, while an example of a form of storing the digital image data 70B of the plurality of frames in the memory 112 is illustratively described, the technology of the present disclosure is not limited thereto. For example, not only the digital image data 70B of the plurality of frames but also compressed image data may be stored in the memory 112. The compressed image data is obtained by performing compression processing using the image processing circuit 110E. The compression processing refers to processing of compressing the digital image data 70B. That is, not only the digital image data 70B of the plurality of frames but also the compressed image data obtained by compressing the digital image data 70B using the image processing circuit 110E that is an example of a "compression circuit" according to the embodiment of the technology of the present disclosure may be stored in the memory 112.

Specifically, the control circuit 110C stores the digital image data 70B of a predetermined number of frames (in the example illustrated in FIG. 15, four frames) in the memory 112. In addition, the control circuit 110C stores the compressed image data obtained by compressing the digital image data using the image processing circuit 110E in the memory 112. Furthermore, the control circuit 110C associates the attribute information related to the compressed image data with compression specifying information for specifying whether or not the image data is compressed in the compressed image data.

Figure 15:
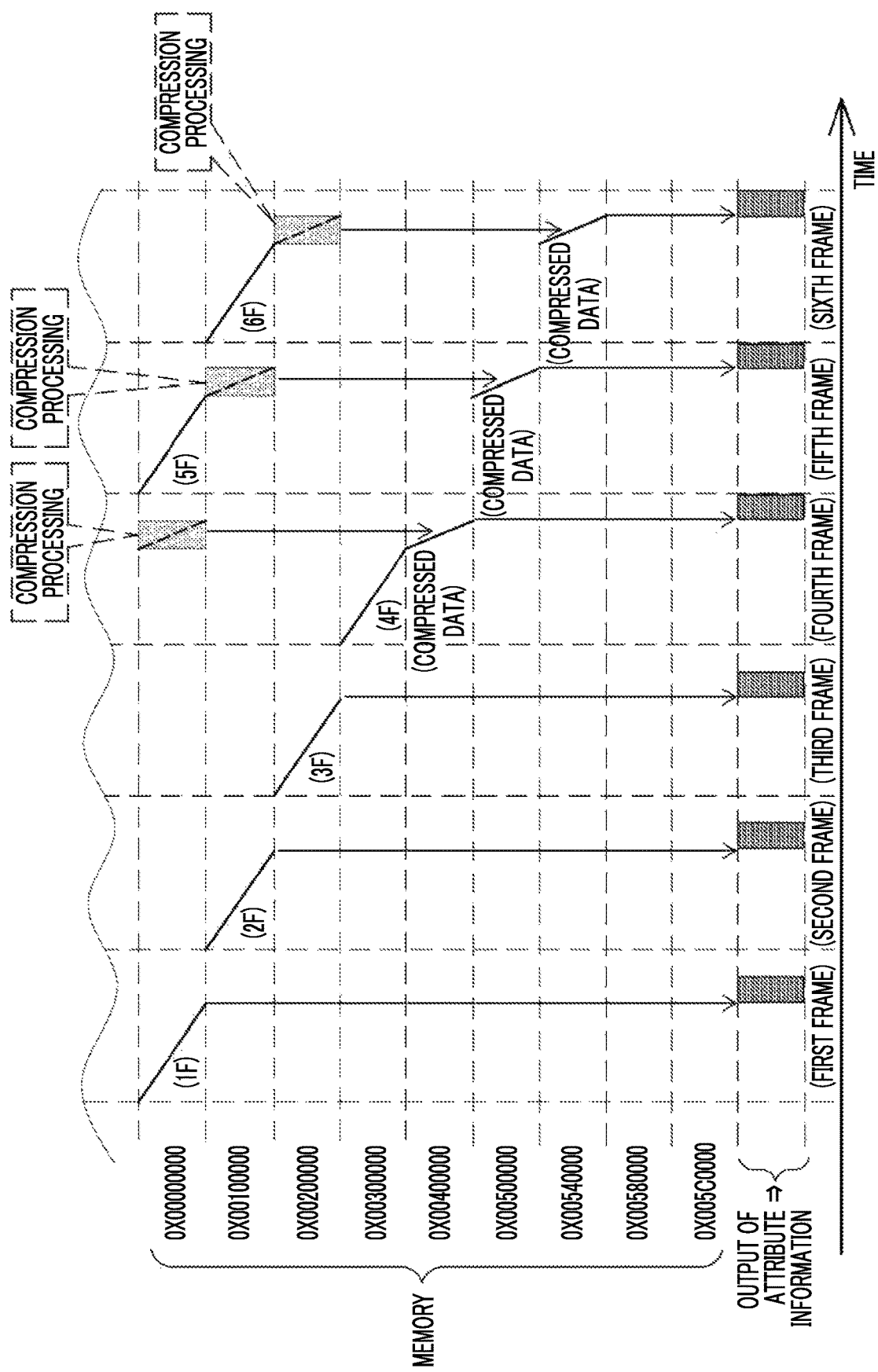
FIG. 15 is a time chart illustrating an example of a processing content of storing the digital image data and compressed image data in the memory in a case where compression processing is performed on the digital image data.

In this case, as illustrated in FIG. 15 as an example, the memory 112 has, in addition to the addresses described in the embodiment, addresses "0X00540000", "0X00580000", and "0X005C0000" and has a storage region of one frame for each address. In the example illustrated in FIG. 15, in a case where the digital image data 70B of the fourth frame is stored in the fourth storage region 112D (storage region having the address "0X00300000"), the compression processing is performed on the digital image data 70B of the fourth frame by the image processing circuit 110E. The compressed image data ("compressed data" in the example illustrated in FIG. 15) obtained by compressing the digital image data 70B of the fourth frame is stored in the fifth storage region 112E (storage region having the address "0X00400000") by the control circuit 110C.

In addition, in the example illustrated in FIG. 15, the digital image data 70B of the first frame is deleted from the first storage region 112A (storage region having the address "0X00000000") by the control circuit 110C along with completion of imaging of the fourth frame. The digital image data 70B of the fifth frame is stored in the first storage region 112A by the control circuit 110C. In a case where the digital image data 70B of the fifth frame is stored in the first storage region 112A, the compression processing is performed on the digital image data 70B of the fifth frame by the image processing circuit 110E. The compressed image data obtained by compressing the digital image data 70B of the fifth frame is stored in the sixth storage region 112F (storage region having the address "0X00500000") by the control circuit 110C.

Furthermore, in the example illustrated in FIG. 15, the digital image data 70B of the second frame is deleted from the second storage region 112B (storage region having the address "0X00100000") by the control circuit 110C along with completion of imaging of the fifth frame. The digital image data 70B of the sixth frame is stored in the second storage region 112B by the control circuit 110C. In a case where the digital image data 70B of the sixth frame is stored in the second storage region 112B, the compression processing is performed on the digital image data 70B of the sixth frame by the image processing circuit 110E. The compressed image data obtained by compressing the digital image data 70B of the sixth frame is stored in a seventh storage region 112G (storage region having the address "0X00540000") by the control circuit 110C.

In such a manner, the digital image data 70B from the fourth frame is compressed by the image processing circuit 110E, and the compressed image data obtained by compression is stored in a vacant storage region of the memory 112 by the control circuit 110C.

In addition, in a case where the digital image data 70B from the fourth frame is compressed and stored in the memory 112 as the compressed image data, the attribute information is generated by the control circuit 110C as illustrated in FIG. 16A and FIG. 16B as an example.

As illustrated in FIG. 16A as an example, the attribute information output in the first frame to the third frame is the same attribute information as in FIG. 11A. The attribute information output in the fourth frame includes the attribute information related to the digital image data 70B of the fourth frame. In the example illustrated in FIG. 16A, the address "0X00300000" for specifying the fourth storage region 112D, the image size, the imaging time point, the imaging condition, and the deletion flag_OFF are illustrated as the attribute information related to the digital image data 70B of the fourth frame. In addition, the deletion flag of the attribute information of the first frame included in the attribute information output in the fourth frame is switched ON. Accordingly, the digital image data 70B of the first frame is deleted from the first storage region 112A along with imaging of the fifth frame. In addition, the attribute information output in the fourth frame includes the attribute information related to the compressed image data of the digital image data 70B of the fifth frame. In the example illustrated in FIG. 16A, the address "0X00400000" for specifying the fifth storage region 112E, the image size, the imaging time point, the imaging condition, and the compression specifying information are illustrated as the attribute information related to the compressed image data of the digital image data 70B of the fifth frame.

As illustrated in FIG. 16B as an example, the attribute information output in the fifth frame includes the attribute information related to the digital image data 70B of the fifth frame. In the example illustrated in FIG. 16B, the address "0X00000000" for specifying the first storage region 112A, the image size, the imaging time point, the imaging condition, and the deletion flag_OFF are illustrated as the attribute information related to the digital image data 70B of the fifth frame. In addition, the deletion flag of the attribute information of the second frame included in the attribute information output in the fifth frame is switched ON. Accordingly, the digital image data 70B of the second frame is deleted from the second storage region 112B along with imaging of the sixth frame. In addition, the attribute information output in the fifth frame includes the attribute information related to the compressed image data of the digital image data 70B of the fifth frame and the attribute information related to the compressed image data of the digital image data 70B of the sixth frame. In the example illustrated in FIG. 16B, the address "0X00500000" for specifying the sixth storage region 112F, the image size, the imaging time point, the imaging condition, and the compression specifying information are illustrated as the attribute information related to the compressed image data of the digital image data 70B of the sixth frame.

As illustrated in FIG. 16B as an example, the attribute information output in the sixth frame includes the attribute information related to the digital image data 70B of the sixth frame. In the example illustrated in FIG. 16B, the address "0X01000000" for specifying the second storage region 112B, the image size, the imaging time point, the imaging condition, and the deletion flag_OFF are illustrated as the attribute information related to the digital image data 70B of the sixth frame. In addition, the deletion flag of the attribute information of the third frame included in the attribute information output in the sixth frame is switched ON. Accordingly, the digital image data 70B of the third frame is deleted from the third storage region 112C along with imaging of the seventh frame. In addition, the attribute information output in the fifth frame includes the attribute information related to the compressed image data of the digital image data 70B of the fifth frame, the attribute information related to the compressed image data of the digital image data 70B of the sixth frame, and the attribute information related to the compressed image data of the digital image data 70B of the seventh frame. In the example illustrated in FIG. 16B, the address "0X00540000", the image size, the imaging time point, the imaging condition, and the compression specifying information are illustrated as the attribute information related to the compressed image data of the digital image data 70B of the seventh frame.

In such a manner, the digital image data 70B of the predetermined number of frames is stored in the memory 112 by the control circuit 110C, and the compressed image data is also stored in the memory 112 by the control circuit 110C. In addition, the attribute information related to the compressed image data is associated with the compression specifying information by the control circuit 110C (in the examples illustrated in FIG. 16A and FIG. 16B, the compression specifying information is included in the attribute information). Accordingly, even in a case where the digital image data 70B and the compressed image data are stored in the memory 112, the digital image data 70B and the compressed image data can be specified in a distinguishable manner.

In the examples illustrated in FIG. 16A and FIG. 16B, while an example of a form of including the address, the image size, the imaging time point, the imaging condition, and the deletion flag in the attribute information related to the digital image data 70B is illustrated, the technology of the present disclosure is not limited thereto. For example, in a case where the compressed image data is stored in the memory 112, as illustrated in FIG. 17A and FIG. 17B as an example, a compression schedule flag indicating whether or not the compressed image data is scheduled to be stored in the memory 112 may be included in the attribute information related to the digital image data 70B in addition to the address, the image size, the imaging time point, the imaging condition, and the deletion flag. The compression schedule flag that is switched ON is an example of "compression schedule information" according to the embodiment of the technology of the present disclosure and indicates that the compressed image data is scheduled to be stored in the memory 112 along with the subsequent imaging. The compression schedule flag that is switched OFF indicates that the compressed image data is not scheduled to be stored in the memory 112 along with the subsequent imaging.

In a case where the compression schedule flag is switched ON, the digital image data 70B related to the attribute information in which the compression schedule flag is switched ON is compressed by the image processing circuit 110E along with the subsequent imaging. For example, as illustrated in FIG. 17A, "compression schedule flag_ON" indicating a state where the compression schedule flag is switched ON is included in the attribute information related to the digital image data 70B of the first frame included in the attribute information output in the third frame. In this case, the digital image data 70B of the first frame is compressed by the image processing circuit 110E along with the subsequent imaging (imaging of the fourth frame), and the compressed image data obtained by compression is stored in the fifth storage region 112E. Consequently, the attribute information related to the compressed image data stored in the fifth storage region 112E (storage region having the address "0X00400000") is included in the attribute information output in the fourth frame. The compression specifying information is included in the attribute information related to the compressed image data stored in the fifth storage region 112E. Accordingly, the rear stage circuit 13 can specify storage of the compressed image data in the fifth storage region 112E.

Timing at which the deletion flag and the compression schedule flag are switched ON are synchronized. As illustrated in FIG. 17A and FIG. 17B as an example, in a case where the deletion flag is switched ON by the control circuit 110C, the compression schedule flag is consequently switched ON by the control circuit 110C. Accordingly, even in a case where the digital image data 70B is deleted from the memory 112, the compressed image data obtained by compressing the digital image data 70B before deletion is held by the memory 112.

In such a manner, in a case where the compressed image data is stored in the memory 112, the compression schedule flag that is switched ON is included in the attribute information output from the output I/F 110D2. Thus, preparation of reception of the compressed image data can be postponed for an output destination (for example, the rear stage circuit 13) of the compressed image data.

For example, MPEG, JPEG, TIFF, PNG, GIF, and BMP are exemplified as a compression format in a case where the digital image data 70B is compressed into the compressed image data. In a case where the compressed image data is stored in the memory 112, as illustrated in FIG. 18A and FIG. 18B as an example, compression format specifying information for specifying the compression format of the compressed image data may be included in the attribute information output from the output I/F 110D2. In the examples illustrated in FIG. 18A and FIG. 18B, the compression format specifying information is included in the attribute information together with the compression specifying information. Accordingly, the output destination (for example, the rear stage circuit 13) of the compressed image data can perform processing in accordance with the compression format.

Figure 19:
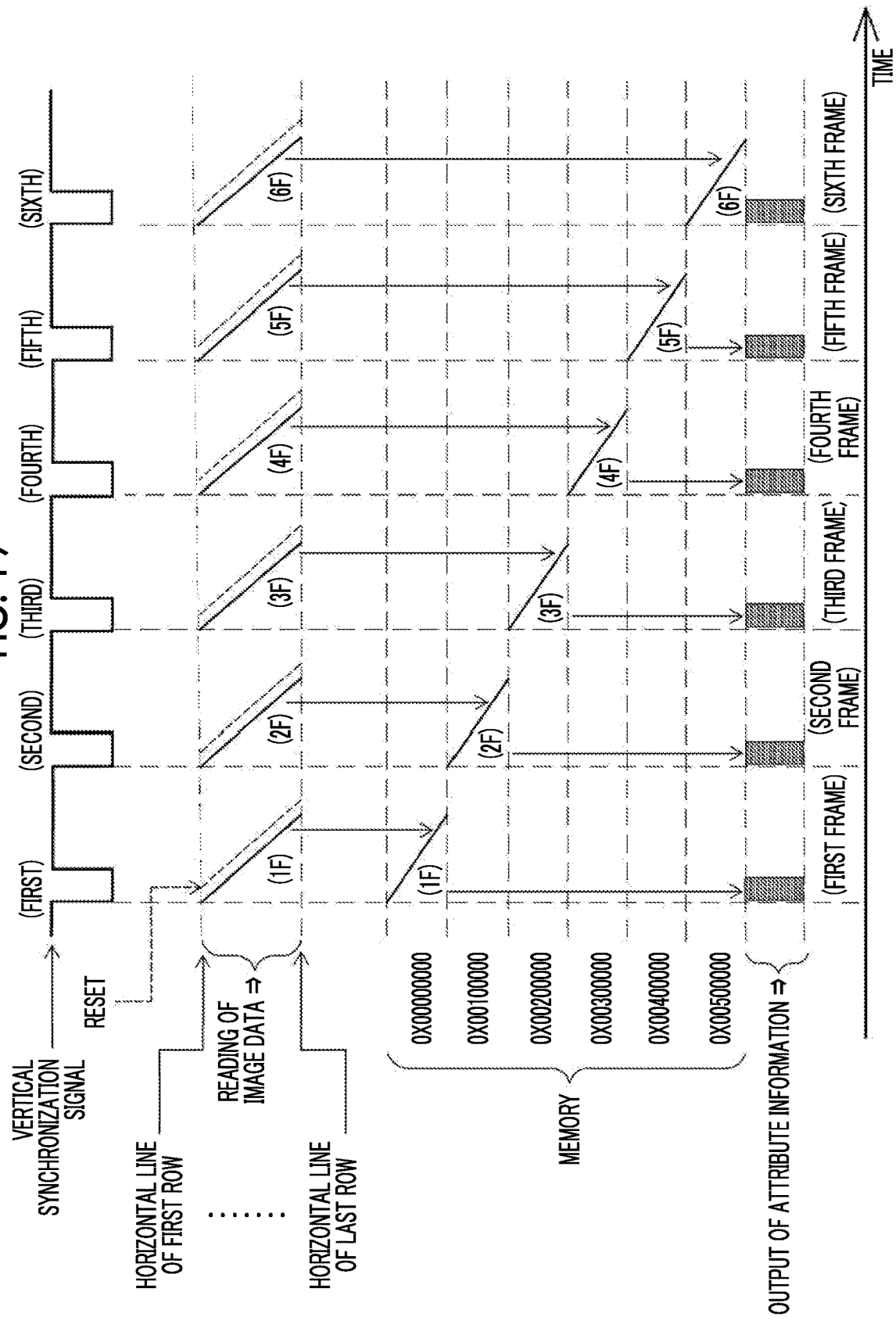
FIG. 19 is a time chart illustrating an example of the processing content in the imaging element in a case where the attribute information is output by the output I/F of the imaging element at a timing of reception of an instruction (for example, a vertical synchronization signal) related to the attribute information by a reception I/F of the imaging element.

In addition, in the embodiment, while an example of a form of storing the digital image data 70B of one frame in the memory 112 and then, outputting the attribute information using the output I/F 110D2 is illustratively described, the technology of the present disclosure is not limited thereto. For example, as illustrated in FIG. 19, the attribute information may be output by the output I/F 110D2 at a timing of reception of the instruction (for example, the vertical synchronization signal) related to the attribute information by the reception I/F 110D1. Accordingly, the attribute information can be immediately provided to the rear stage circuit 13 in response to the instruction related to the attribute information.

In the embodiment, while an example of a form of including the attribute information of a plurality of frames in the attribute information output for each frame is illustratively described, the technology of the present disclosure is not limited thereto. For example, as illustrated in FIG. 20, the attribute information output for each frame may be only the attribute information related to the digital image data 70B of the corresponding frame. In this case, an information amount of the attribute information output to the signal processing circuit 34 for each frame can be decreased, compared to a case where the attribute information of the plurality of frames is included in the attribute information output for each frame.

In the example illustrated in FIG. 20, while the deletion flag and the compression schedule flag are included in the attribute information output for each frame, the technology of the present disclosure is not limited thereto. For example, as illustrated in FIG. 21, the deletion flag and the compression schedule flag may not be included in the attribute information output for each frame. In addition, in the attribute information output for each frame, the deletion flag may not be included, and the compression schedule flag may be included.

In addition, in the embodiment, while an example of a form of outputting the attribute information related to each of all frames using the output I/F 110D2 is illustratively described, the technology of the present disclosure is not limited thereto. An instruction for the number of frames of the attribute information to be output to the output I/F 110D2 may be issued to the imaging element 38 from a rear stage circuit 13 side.

Figure 22:
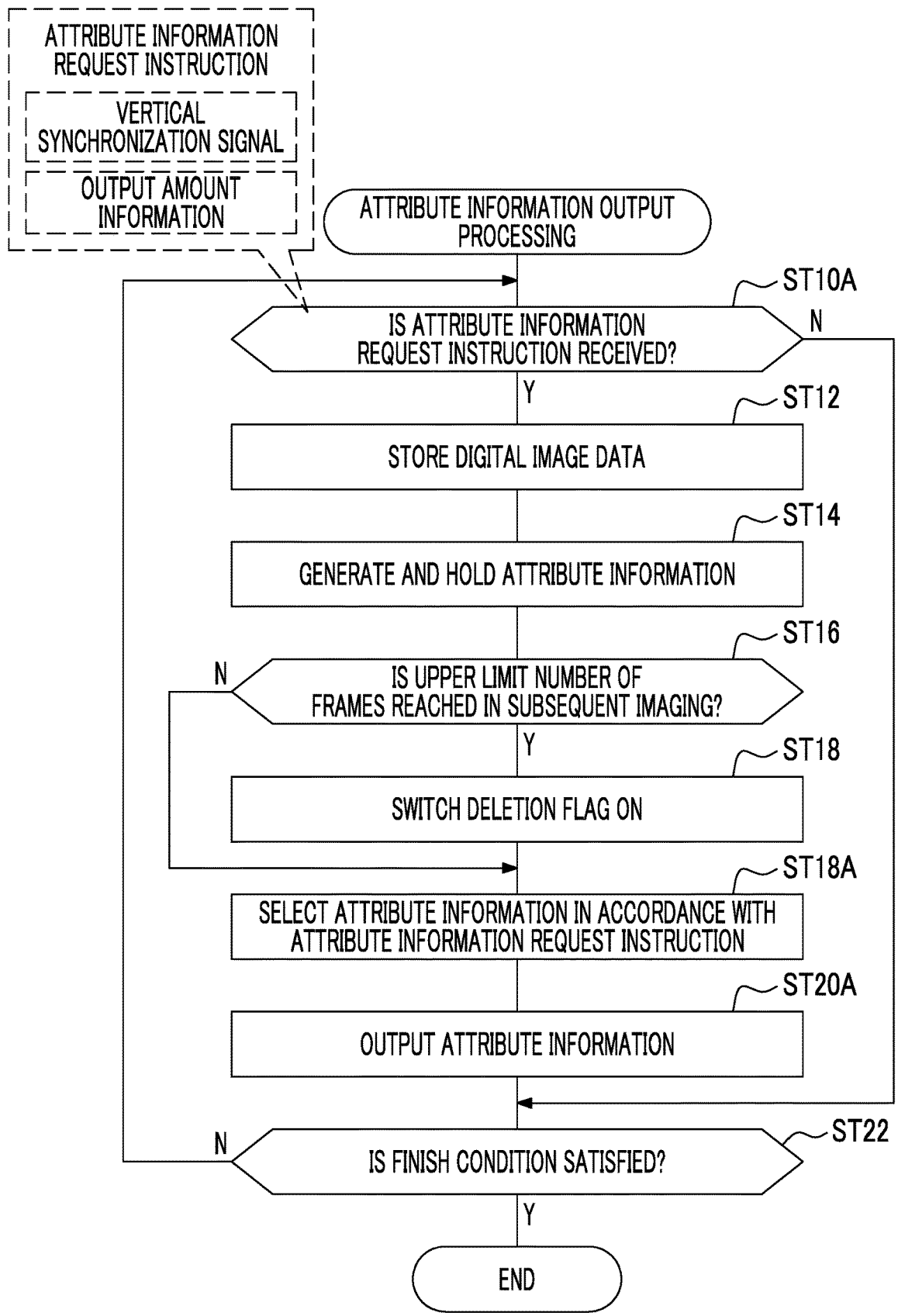
FIG. 22 is a flowchart illustrating a modification example of the flow of attribute information output processing according to the embodiment.

In this case, for example, instead of the attribute information output processing illustrated in FIG. 13, attribute information output processing illustrated in FIG. 22 as an example is executed by the processing circuit 110 of the imaging element 38.

The attribute information output processing illustrated in FIG. 22 is different from the attribute information output processing illustrated in FIG. 13 in that step ST10A is included instead of step ST10, step ST18A is included instead of step ST18, and step ST20A is included instead of step ST20. The controller 15 outputs an attribute information request instruction to the imaging element 38 through the output I/F 15D. The attribute information request instruction includes the vertical synchronization signal and output amount information. The output amount information refers to information indicating an output amount of the attribute information by the output I/F 110D2 of the imaging element 38. For example, the "output amount" here is defined as the number of frames.

In the attribute information output processing illustrated in FIG. 22, in step ST10A, the control circuit 110C determines whether or not the attribute information request instruction output from the controller 15 is received by the reception I/F 110D1. In step ST10A, in a case where the attribute information request instruction is not received by the reception I/F 110D1, a negative determination is made, and the attribute information output processing transitions to step ST22. In step ST10A, in a case where the attribute information request instruction is received by the reception I/F 110D1, a positive determination is made, and the attribute information output processing transitions to step ST12.

In step ST18A, the control circuit 110C selects the attribute information to be output to the signal processing circuit 34 by the output I/F 110D2 among pieces of the attribute information held at the current point in time in accordance with the output amount indicated by the output amount information included in the attribute information request instruction. For example, in a case where the output amount indicated by the output amount information is one frame, the control circuit 110C selects the attribute information related to the most recent digital image data 70B of one frame. In a case where the output amount indicated by the output amount information is two frames, the control circuit 110C selects the attribute information related to the most recent digital image data 70B of two frames.

In step ST20A, the control circuit 110C outputs the attribute information selected in step ST18A to the signal processing circuit 34 using the output I/F 110D2. Accordingly, output of more than a necessary amount of the attribute information from the output I/F 110D2 can be avoided. In addition, since the output amount is defined as the number of frames, the rear stage circuit 13 can process the attribute information in units of frames.

Figure 23:
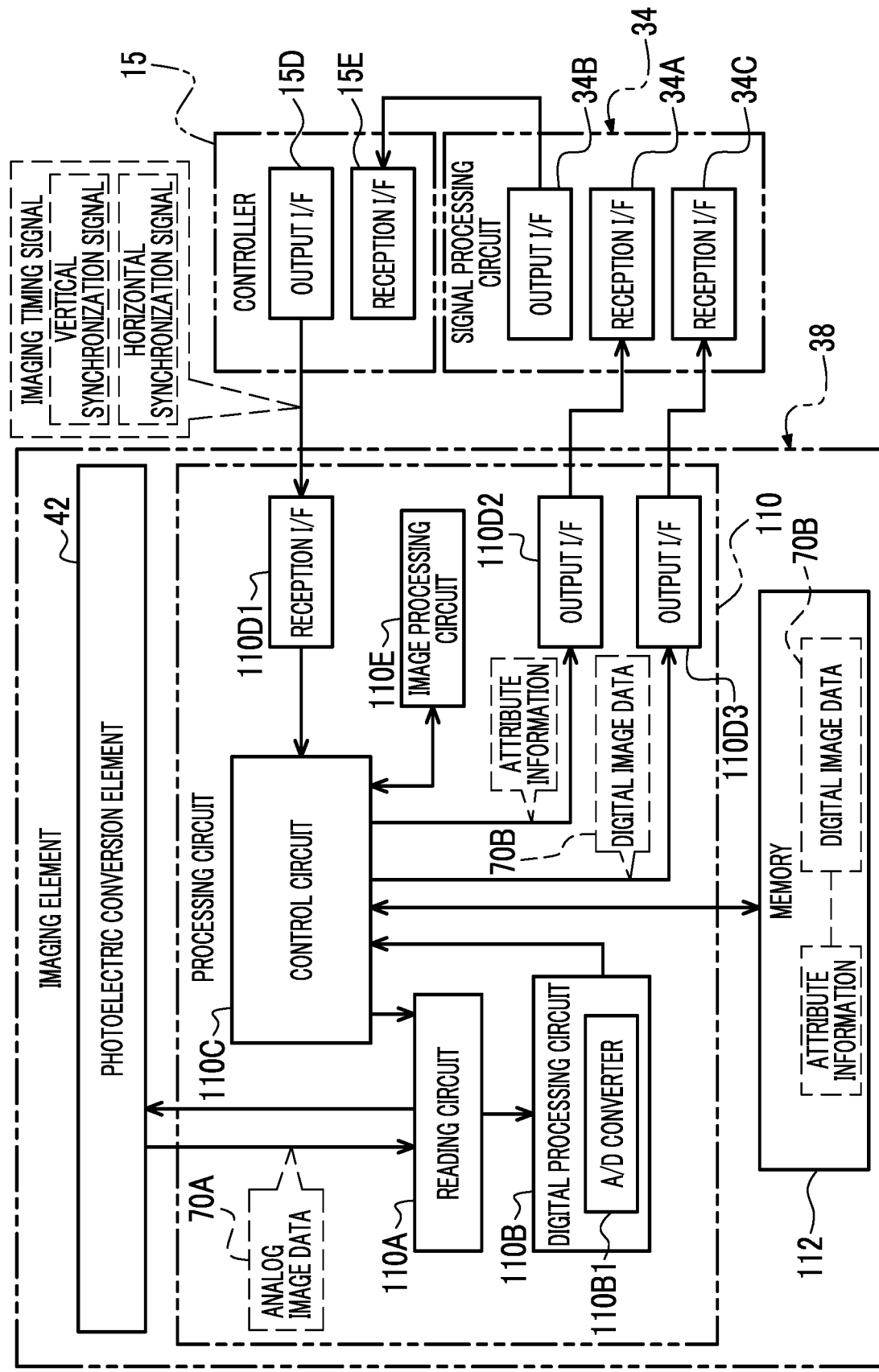
FIG. 23 is a block diagram illustrating a modification example of the hardware configuration of the electric system of the imaging element included in the imaging apparatus according to the embodiment.

In addition, in the embodiment, while an example of a form of outputting the attribute information and the digital image data 70B to the signal processing circuit 34 using the output I/F 110D2 is illustratively described, the technology of the present disclosure is not limited thereto. For example, as illustrated in FIG. 23, the attribute information and the digital image data 70B may be output to the signal processing circuit 34 by the output I/F 110D2 and an output I/F 110D3. In the example illustrated in FIG. 23, the processing circuit 110 includes the output I/F 110D2 and the output I/F 110D3. The output I/F 110D3 is an example of a "first output portion" according to the embodiment of the technology of the present disclosure. The output I/F 110D2 is an example of a "second output portion" according to the embodiment of the technology of the present disclosure.

The output I/F 110D3 is connected to the control circuit 110C. In addition, the signal processing circuit 34 comprises a reception I/F 34C. The output I/F 110D2 outputs the attribute information to the signal processing circuit 34. The attribute information output by the output I/F 110D2 is received by the reception I/F 34A of the signal processing circuit 34. In addition, the output I/F 110D3 outputs the digital image data 70B to the signal processing circuit 34 under control of the control circuit 110C. The digital image data 70B output by the output I/F 110D3 is received by the reception I/F 34C of the signal processing circuit 34.

According to the configuration illustrated in FIG. 23, the attribute information is output by the output I/F 110D2, and the digital image data 70B is output by the output I/F 110D3. Thus, the attribute information and the digital image data 70B can be output in parallel.

While the imaging apparatus 10 of the interchangeable lens type is illustrated in the embodiment, the technology of the present disclosure is not limited thereto. For example, as illustrated in FIG. 24, an imaging apparatus main body 214 having configurations and functions corresponding to the imaging apparatus main body 12 described in the embodiment may be mounted in a smart device 200.

Figure 24:
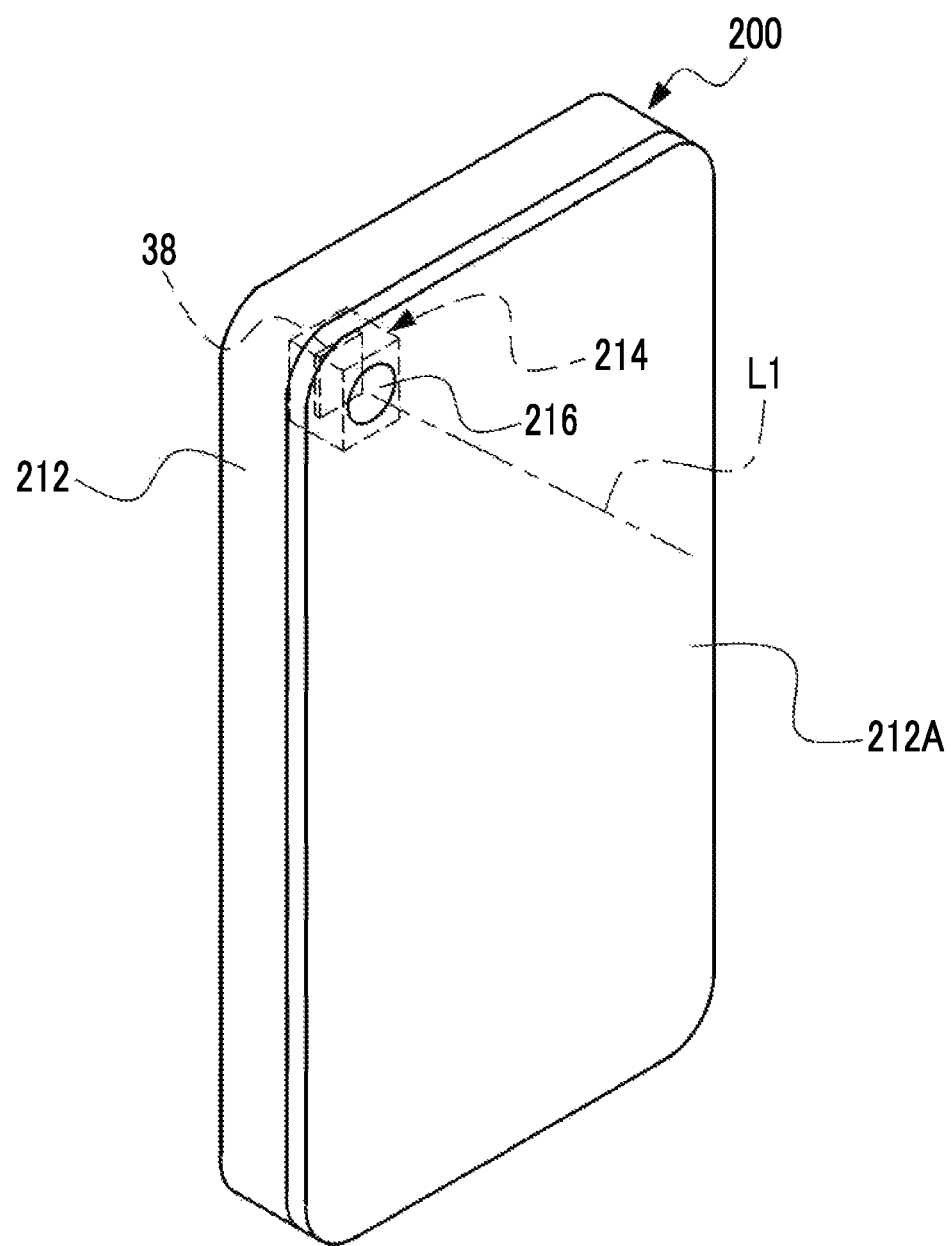
FIG. 24 is a perspective rear view illustrating an example of an exterior on a rear surface side of a smart device according to the embodiment.

As illustrated in FIG. 24 as an example, the smart device 200 comprises a housing 212, and the imaging apparatus main body 214 is accommodated in the housing 212. A smartphone is exemplified as an example of the smart device 200. Here, for example, a smartphone or a tablet terminal that is an electronic apparatus having an imaging function is exemplified as the smart device 200.

An imaging lens 216 is attached to the housing 212. In the example illustrated in FIG. 24, the imaging lens 216 is exposed from a rear surface 212A in an upper left portion of the rear surface 212A of the housing 212 in a case where the smart device 200 is in a vertically placed state. A center of the imaging lens 216 is positioned on the optical axis L1. The imaging apparatus main body 214 incorporates the imaging element 38. The imaging apparatus main body 214 acquires the subject light from the imaging lens 216. The image of the subject light acquired in the imaging apparatus main body 214 is formed on the imaging element 38, and imaging is performed as described in the embodiment.

Figure 25:
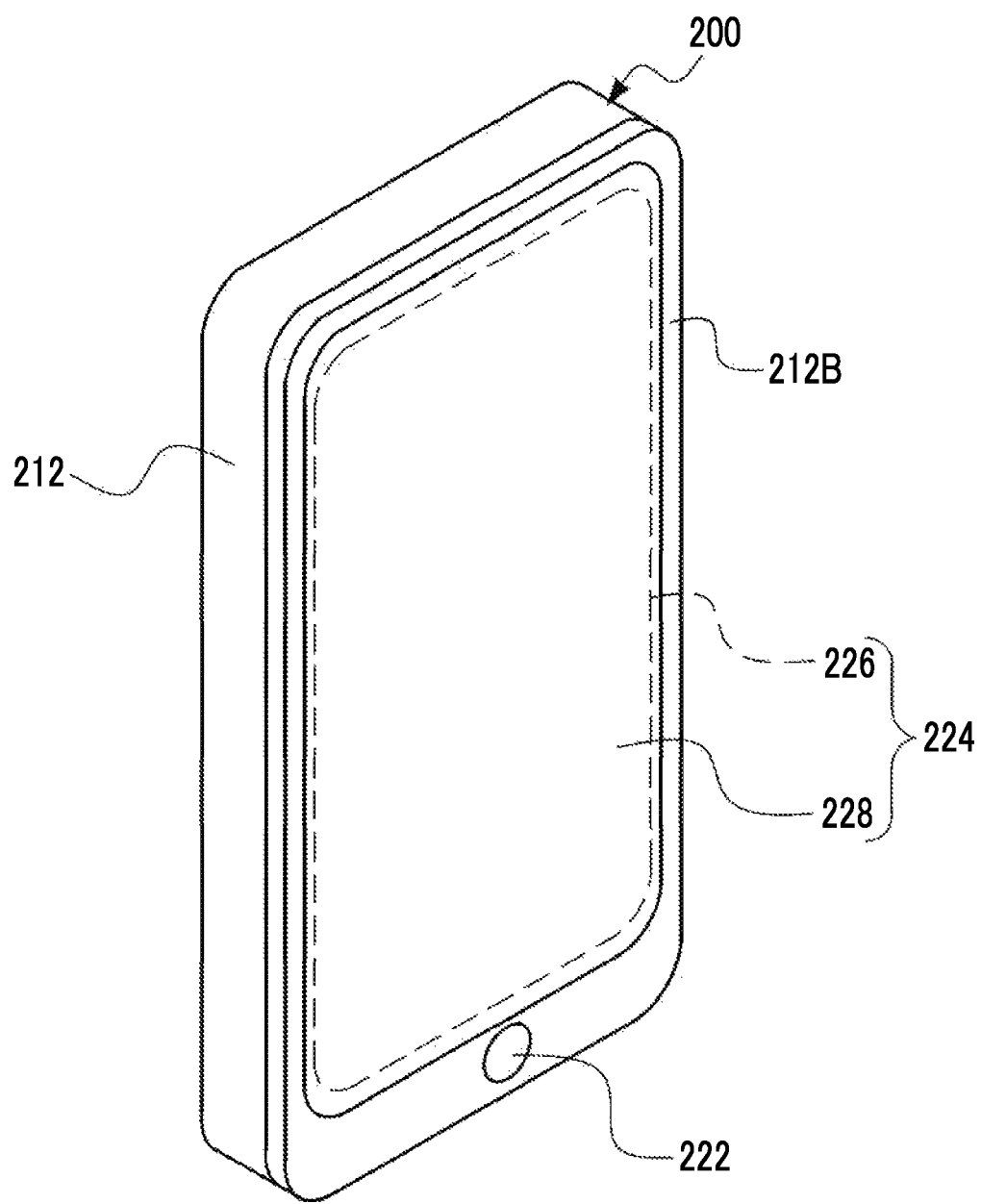
FIG. 25 is a perspective front view illustrating an example of the exterior on a front surface side of the smart device illustrated in FIG. 24.

As illustrated in FIG. 25 as an example, an instruction key 222 and a touch panel display 224 are disposed on a front surface 212B of the housing 212. In a lower portion of the front surface 212B in a case where the smart device 200 is in a vertically placed state, the instruction key 222 is arranged, and the touch panel display 224 is arranged above the instruction key 222. The touch panel display 224 comprises a display 226 and a touch panel 228. The touch panel 228 is overlaid on the display 226. The touch panel display 224 and the instruction key 222 have the same function as the UI system device 17 described in the embodiment. That is, the touch panel display 224 and the instruction key 222 present information to the user or receive an instruction from the user. For example, the instruction from the user is implemented by performing a touch operation on a soft key (for example, a soft key corresponding to the release button 20 or the like) displayed on the touch panel display 224.

The display 226 is an example of the "display portion (display)" according to the embodiment of the technology of the present disclosure. In addition, the smart device 200 is an example of an "imaging apparatus" according to the embodiment of the technology of the present disclosure. In addition, while an example of a form of incorporating only the imaging apparatus main body 214 in the smart device 200 is illustrated in the example illustrated in FIG. 24, the technology of the present disclosure is not limited thereto. A plurality of digital cameras may be incorporated in the smart device 200. In this case, the imaging apparatus main body 214 may be mounted in at least one digital camera.

In addition, in the embodiment, while the imaging element in which the photoelectric conversion element 42, the processing circuit 110, and the memory 112 are formed in one chip is illustrated as the imaging element 38, the technology of the present disclosure is not limited thereto. For example, at least the photoelectric conversion element 42 and the memory 112 among the photoelectric conversion element 42, the processing circuit 110, and the memory 112 may be formed in one chip.

In addition, in the embodiment, while the attribute information is illustrated as information including the address, the image size, the imaging time point, and the imaging condition, the technology of the present disclosure is not limited thereto. For example, the attribute information may be information including the address among the address, the image size, the imaging time point, and the imaging condition or may be information including the address, the image size, the imaging time point, and/or the imaging condition.

In addition, in the embodiment, while the communication I/Fs are connected in accordance with the PCI-e connection standard, the technology of the present disclosure is not limited thereto. Instead of the PCI-e connection standard, other connection standards such as LVDS, SATA, SLVS-EC, or MIPI may be employed.

In addition, in the embodiment, all of communication between the imaging element 38 and the signal processing circuit 34, communication between the controller 15 and the imaging element 38, and communication between the signal processing circuit 34 and the controller 15 are wired communication. However, the technology of the present disclosure is not limited thereto. Communication between the imaging element 38 and the signal processing circuit 34, communication between the controller 15 and the imaging element 38, and/or communication between the signal processing circuit 34 and the controller 15 may be wireless communication.

In addition, in the embodiment, while an example of a form of incorporating the UI system device 17 in the imaging apparatus main body 12 is illustratively described, at least a part of a plurality of constituents included in the UI system device 17 may be externally attached to the imaging apparatus main body 12. In addition, at least a part of the plurality of constituents included in the UI system device 17 may be used as being connected to the external I/F 104 as a separate body.

In addition, in the embodiment, while 120 fps is illustrated as the frame rate, the technology of the present disclosure is not limited thereto. An imaging frame rate (for example, the frame rate applied to the imaging step illustrated in FIG. 9) and an output frame rate (for example, the frame rate applied to the output step illustrated in FIG. 9 and/or the output frame rate of the digital image data 70B) may be different frame rates. The imaging frame rate and/or the output frame rate may be a fixed frame rate or may be a variable frame rate. In a case of the variable frame rate, for example, the frame rate may be changed in a case where a predetermined condition (for example, a condition that an instruction to change the frame rate is received by the reception device 84, and/or a condition that a timing decided in advance as a timing for changing the frame rate is reached) is satisfied. In a case of the variable frame rate, for example, a specific numerical value of the frame rate may be changed in accordance with the instruction received by the reception device 84 or may be changed in accordance with an operation rate of the rear stage circuit 13 and/or the imaging element 38.

In addition, while the signal processing circuit 34 is illustrated in the embodiment, the technology of the present disclosure is not limited thereto. One or more signal processing circuits may be used in addition to the signal processing circuit 34. In this case, the imaging element 38 may be directly connected to each of a plurality of signal processing circuits.

In addition, while an example of a form of implementing the processing circuit 110 by the device including the ASIC and the FPGA is illustratively described in the embodiment, the technology of the present disclosure is not limited thereto. For example, at least the control circuit 110C of a plurality of devices included in the processing circuit 110 may be implemented by a software configuration using a computer.

Figure 26:
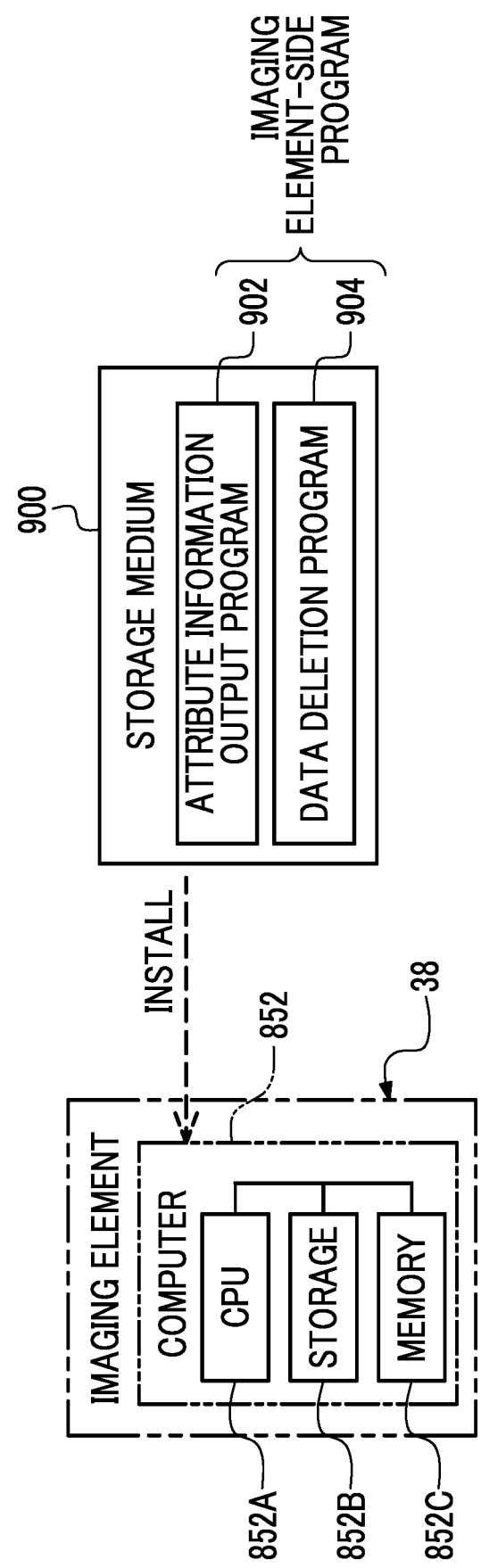
FIG. 26 is a conceptual diagram illustrating an example of an aspect in which an imaging element-side program is installed on a computer in the imaging element from a storage medium storing the imaging element-side program according to the embodiment.

In this case, for example, as illustrated in FIG. 26, the imaging element 38 incorporates a computer 852. An attribute information output program 902 causing the computer 852 to execute the attribute information output processing according to the embodiment and a data deletion program 904 causing the computer 852 to execute the data deletion processing according to the embodiment are stored in a storage medium 900. Any portable storage medium such as an SSD or a USB memory that is a non-temporary storage medium is exemplified as an example of the storage medium 900. Hereinafter, for convenience of description, the attribute information output processing and the data deletion processing will be referred to as "imaging element-side processing" unless otherwise necessary to distinguish therebetween. The attribute information output program 902 and the data deletion program 904 will be referred to as an "imaging element-side program" unless otherwise necessary to distinguish therebetween.

The computer 852 comprises a CPU 852A, a storage 852B, and a memory 852C. The storage 852B is a non-volatile storage device such as an EEPROM, and the memory 852C is a volatile storage device such as a RAM. The imaging element-side program stored in the storage medium 900 is installed on the computer 852. The CPU 852A executes the imaging element-side processing in accordance with the imaging element-side program.

The imaging element-side program may be stored in the storage 852B instead of the storage medium 900. In this case, the CPU 852A reads out the image imaging element-side program from the storage 852B and loads the read imaging element-side program into the memory 852C. The CPU 852A executes the imaging element-side processing in accordance with the imaging element-side program loaded in the memory 852C.

In addition, while an example of a form of storing the attribute information output program 902 and the data deletion program 904 in the storage 852B is exemplified here, the technology of the present disclosure is not limited thereto. One of the attribute information output program 902 and the data deletion program 904 may be stored in the storage 852B, and the other may be stored in the storage medium 900.

In addition, the imaging element-side program may be stored in a storage portion of another computer, a server apparatus, or the like connected to the computer 852 through a communication network (not illustrated), and the imaging element-side program may be downloaded to the computer 852 in response to a request from the imaging apparatus 10 or the smart device 200 and be installed on the computer 852.

The entire imaging element-side program does not need to be stored in the storage portion of the other computer or the server apparatus connected to the computer 852, and a part (for example, the attribute information output program 902 or the data deletion program 904) of the imaging element-side program may be stored.

In the example illustrated in FIG. 26, while an example of a form of incorporating the computer 852 in the imaging element 38 is illustrated, the technology of the present disclosure is not limited thereto. For example, the computer 852 may be disposed on an outside of the imaging element 38.

In the example illustrated in FIG. 26, the CPU 852A may be a single CPU or include a plurality of CPUs. In addition, a GPU may be applied instead of the CPU 852A.

In the example illustrated in FIG. 26, while the computer 852 is illustrated, the technology of the present disclosure is not limited thereto. A device including an ASIC, an FPGA, and/or a PLD may be applied instead of the computer 852. In addition, a combination of a hardware configuration and a software configuration may be used instead of the computer 852.

Various processors illustrated below can be used as a hardware resource for executing the imaging element-side processing described in the embodiment. For example, as described above, a CPU that is a general-purpose processor functioning as the hardware resource for executing the imaging element-side processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the imaging element-side processing using the memory.

The hardware resource for executing the imaging element-side processing may be configured with one of those various processors or may be configured with a combination of two or more processors of the same type or different types (for example, a combination of a plurality of FPGAs or a combination of a CPU and an FPGA). In addition, the hardware resource for executing the imaging element-side processing may be one processor.

As an example of a configuration with one processor, first, as represented by a computer such as a client and a server, a form in which one processor is configured with a combination of one or more CPUs and software, and in which this processor functions as a hardware resource for executing the imaging element-side processing is available. Second, as represented by an SoC or the like, a form of using a processor that implements, by one IC chip, a function of the entire system including a plurality of hardware resources for executing the imaging element-side processing is available. In such a manner, the imaging element-side processing is implemented using one or more of the various processors as the hardware resource.

Furthermore, as a hardware structure of those various processors, more specifically, an electric circuit in which circuit elements such as semiconductor elements are combined can be used.

In addition, while the imaging apparatus 10 is illustrated in the example illustrated in FIG. 1, and the smart device 200 is illustrated in the example illustrated in FIG. 24, the technology of the present disclosure is not limited thereto. That is, the technology of the present disclosure can be applied to various electronic apparatuses (for example, a fixed lens camera, a personal computer, a wearable terminal apparatus or the like) incorporating the imaging apparatus having configurations and functions corresponding to the imaging apparatus main body 12 described in the embodiment. Even with these electronic apparatuses, the same actions and effects as the imaging apparatus 10 and the smart device 200 are obtained.

In addition, while the displays 26 and 226 are illustrated in the embodiment, the technology of the present disclosure is not limited thereto. For example, a separate display that is retrofit into the imaging apparatus may be used as the "display portion" according to the embodiment of the technology of the present disclosure.

In addition, the various types of processing are merely an example. Accordingly, unnecessary steps may be deleted, new steps may be added, or a processing order may be rearranged without departing from a gist of the technology of the present disclosure.

Above-described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiment of the technology of the present disclosure. Thus, unnecessary parts may be removed, new elements may be added, or parts may be replaced in the above-described contents and the illustrated contents without departing from the gist of the technology of the present disclosure. In addition, particularly, description related to common technical knowledge or the like that does not need to be described in terms of embodying the technology of the present disclosure is omitted in the above-described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendices are further disclosed with respect to the embodiment.

APPENDIX 1

An imaging element incorporating a processor, and a memory that is incorporated in the imaging element and stores image data obtained by imaging, in which the processor is configured to control storage of the image data in the memory, store attribute information of the image data in the memory, output the image data stored in the memory, receive an instruction related to the attribute information, and output the attribute information corresponding to the received instruction.

What is claimed is:

1. An image sensor including:
a memory that is incorporated in the image sensor and stores image data obtained by imaging;
a control circuit that is incorporated in the image sensor, that controls storage of the image data in the memory, and that generates and stores attribute information of the image data in the memory;
an output interface that is incorporated in the image sensor and outputs the image data stored in the memory; and
a reception interface that receives an instruction related to the attribute information,
wherein the output interface outputs the attribute information corresponding to the instruction received by the reception interface, and
wherein at least a photoelectric conversion element and the memory are formed in one chip.

2. The image sensor according to claim 1,
wherein the output interface outputs the attribute information at a timing of reception of the instruction by the reception interface.

3. The image sensor according to claim 1,
wherein the instruction is a frame synchronization signal from an outside.

4. The image sensor according to claim 1,
wherein the output interface outputs the attribute information related to most recent image data among pieces of the image data stored in the memory.

5. The image sensor according to claim 4,
wherein the output interface outputs the attribute information related to the most recent image data at a timing of reception of the instruction by the reception interface.

6. The image sensor according to claim 1,
wherein the output interface is capable of outputting the attribute information of each of a plurality of pieces of the image data, and
the attribute information is output in an imaging order by the output interface.

7. The image sensor according to claim 1,
wherein the attribute information is information including at least one of an address, an image size, an imaging time point, or an imaging condition.

8. The image sensor according to claim 1,
wherein in a case where the image data is deleted from the memory along with subsequent imaging, the attribute information output from the output interface is information including deletion information indicating that the image data is deleted from the memory along with the subsequent imaging.

9. The image sensor according to claim 8,
wherein in a case where the image data is deleted from the memory, the control circuit deletes, from the memory, the attribute information related to deletion target image data that is the image data of a deletion target in the memory, and deletes the deletion target image data from the memory.

10. An image sensor, comprising:
a memory that is incorporated in the image sensor and stores image data obtained by imaging;
a control circuit that is incorporated in the image sensor, that controls storage of the image data in the memory, and that generates and stores attribute information of the image data in the memory;
an output interface that is incorporated in the image sensor and outputs the image data stored in the memory;
a reception interface that receives an instruction related to the attribute information; and
a compression circuit that compresses the image data,
wherein the output interface outputs the attribute information corresponding to the instruction received by the reception interface, and
wherein the control circuit stores the image data of a predetermined number of frames in the memory, stores compressed image data obtained by compressing the image data using the compression circuit in the memory, and associates the attribute information related to the compressed image data with compression specifying information for specifying compression of the image data in the compressed image data.

11. The image sensor according to claim 10,
wherein in a case where the compressed image data is stored in the memory, the attribute information output from the output interface is information including compression schedule information indicating that the compressed image data is scheduled to be stored in the memory.

12. The image sensor according to claim 10,
wherein the attribute information output from the output interface is information including information for specifying a compression format of the compressed image data.

13. The image sensor according to claim 1,
wherein the instruction includes an output amount of the attribute information by the output interface, and
the output interface outputs the attribute information in the output amount.

14. The image sensor according to claim 13,
wherein the output amount is defined as the number of frames of the image data.

15. An image sensor, comprising:
a memory that is incorporated in the image sensor and stores image data obtained by imaging;
a control circuit that is incorporated in the image sensor, that controls storage of the image data in the memory, and that generates and stores attribute information of the image data in the memory;
an output interface that is incorporated in the image sensor and outputs the image data stored in the memory;
a reception interface that receives an instruction related to the attribute information; and
a receiver that receives the attribute information transmitted from a rear stage circuit positioned on a rear stage of the image sensor,
wherein the output interface outputs the attribute information corresponding to the instruction received by the reception interface, and
wherein the control circuit acquires the image data from the memory in accordance with the attribute information received by the receiver and outputs the acquired image data to the rear stage circuit using the output interface.

16. The image sensor according to claim 1,
wherein the output interface includes a first output interface and a second output interface,
the first output interface outputs the image data, and the second output interface outputs the attribute information.

17. The image sensor according to claim 1,
wherein element image sensor is a laminated image sensor in which the photoelectric conversion element is laminated with the memory.

18. An imaging apparatus comprising:
the image sensor according to claim 1; and
a control device that performs at least one of a control for displaying an image based on the image data output by the output interface on a display or a control for storing the image data output by the output interface in a storage device.

19. An operation method of an image sensor incorporating a memory that stores image data obtained by imaging, the operation method comprising:
controlling storage of the image data in the memory via a control circuit that is incorporated in the image sensor;
generating and storing attribute information of the image data in the memory, via the control circuit;
outputting the image data stored in the memory, via an output interface that is incorporated in the image sensor;
receiving an instruction related to the attribute information; and
outputting the attribute information corresponding to the received instruction,
wherein at least a photoelectric conversion element and the memory are formed in one chip.

20. A non-transitory computer-readable storage medium storing a program for a computer applied to an image sensor incorporating a memory that stores image data obtained by imaging, the program causing the computer to execute a process comprising:
controlling storage of the image data in the memory via a control circuit that is incorporated in the image sensor;
generating and storing attribute information of the image data in the memory, via the control circuit;
outputting the image data stored in the memory, via an output interface that is incorporated in the image sensor;
receiving an instruction related to the attribute information; and
outputting the attribute information corresponding to the received instruction,
wherein at least a photoelectric conversion element and the memory are formed in one chip.

* * * * *